(12) United States Patent
Baek et al.

(10) Patent No.: US 11,290,221 B2
(45) Date of Patent: *Mar. 29, 2022

(54) METHOD AND APPARATUS FOR TRANSMITTING AND RECEIVING DATA IN A COMMUNICATION SYSTEM

(71) Applicant: Samsung Electronics Co., Ltd., Suwon-si (KR)

(72) Inventors: Sangkyu Baek, Yongin-si (KR); Hyunjeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

This patent is subject to a terminal disclaimer.

(21) Appl. No.: 17/011,206

(22) Filed: Sep. 3, 2020

(65) Prior Publication Data

US 2020/0403739 A1 Dec. 24, 2020

Related U.S. Application Data

(63) Continuation of application No. 16/543,031, filed on Aug. 16, 2019, which is a continuation of application
(Continued)

(51) Int. Cl.
*H04L 1/18* (2006.01)
*H04L 1/16* (2006.01)
(Continued)

(52) U.S. Cl.
CPC .......... *H04L 1/1864* (2013.01); *H04L 1/1635* (2013.01); *H04L 1/1642* (2013.01);
(Continued)

(58) Field of Classification Search
CPC ..... H04L 47/34; H04L 1/1861; H04L 1/1864; H04L 1/1829; H04L 47/36; H04L 1/188;
(Continued)

(56) References Cited

U.S. PATENT DOCUMENTS 6,950,420 B2   9/2005  Sarkkinen et al.
8,248,942 B2   8/2012  Wing et al.
(Continued)

FOREIGN PATENT DOCUMENTS

KR   10-2005-0063588 A   6/2005
KR   10-0519612 B1   10/2005
(Continued)

OTHER PUBLICATIONS

Korean Office Action dated May 27, 2021, issued in a counterpart Korean Application No. 10-2017-0039994.
(Continued)

*Primary Examiner* — Rownak Islam
(74) *Attorney, Agent, or Firm* — Jefferson IP Law, LLP

(57) ABSTRACT

The present disclosure relates to a fifth generation (5G) or pre-5G communication system to be provided to support a higher data transmission rate since fourth generation (4G) communication systems like long-term evolution (LTE). A method of a receiver in a wireless communication system is provide. The method includes receiving at least one packet, identifying whether there is a non-received packet among the at least one packet, and transmitting status report information when there is the non-received packet, in which the status report information includes a field indicating whether there are consecutively non-received packets.

15 Claims, 41 Drawing Sheets

Related U.S. Application Data

No. 15/471,554, filed on Mar. 28, 2017, now Pat. No. 10,396,942.

(60) Provisional application No. 62/327,076, filed on Apr. 25, 2016, provisional application No. 62/324,041, filed on Apr. 18, 2016, provisional application No. 62/314,661, filed on Mar. 29, 2016.

(51) Int. Cl.
*H04L 47/34* (2022.01)
*H04L 47/36* (2022.01)
*H04L 69/166* (2022.01)
*H04W 28/02* (2009.01)

(52) U.S. Cl.
CPC .............. *H04L 47/34* (2013.01); *H04L 47/36* (2013.01); *H04L 69/166* (2013.01); *H04W 28/0278* (2013.01); *H04L 1/1829* (2013.01); *H04L 1/1861* (2013.01)

(58) Field of Classification Search
CPC ..... H04L 69/16; H04L 69/166; H04L 1/1825; H04L 1/1635; H04L 1/1642; H04W 28/0278; H04W 28/02
USPC ........................................................ 370/252
See application file for complete search history.

(56) References Cited

U.S. PATENT DOCUMENTS

| | | |
|---|---|---|
| 2009/0086656 A1 | 4/2009 | Kuchibhotla et al. |
| 2009/0086710 A1 | 4/2009 | Ho |
| 2009/0086760 A1 | 4/2009 | Vedantham et al. |
| 2009/0175259 A1 | 7/2009 | Lucky |
| 2009/0290598 A1 | 11/2009 | Pani et al. |
| 2010/0157904 A1 | 6/2010 | Ho et al. |
| 2010/0322155 A1 | 12/2010 | Meyer et al. |
| 2011/0164664 A1 | 7/2011 | Torsner et al. |
| 2015/0146617 A1 | 5/2015 | Park et al. |
| 2015/0155977 A1 | 6/2015 | Torsner et al. |
| 2018/0317119 A1 | 11/2018 | Fu et al. |
| 2018/0376372 A1 | 12/2018 | Turtinen et al. |

FOREIGN PATENT DOCUMENTS

| | | | |
|---|---|---|---|
| KR | 20070031810 A | * | 3/2007 |
| WO | 2014/119946 A1 | | 8/2014 |

OTHER PUBLICATIONS

U.S. Office Action dated May 28, 2021, issued by the U.S. Patent and Trademark Office U.S. Appl. No. 16/543,031.

* cited by examiner

FIG. 4

| D/C | RF | P | FI | E | LSF | R1 | Oct 1 |
|---|---|---|---|---|---|---|---|
| | | | SN | | | | Oct 2 |
| | | | SN | | | | Oct 3 |
| | | | SO | | | | Oct 4 |
| | | | SO | | | | Oct 5 |
| E | | | $LI_i$ | | | | Oct 6 |
| | | | $LI_i$ | | | | Oct 7 |
| | | | ... | | | | |
| E | | | $LI_K$ | | | | Oct [2·K-4] |
| | | | $LI_K$ | | | | Oct [2·K-5] |
| | | | Data | | | | Oct [2·K-6] |
| | | | ... | | | | |
| | | | | | | | Oct N |

FIG. 7A

| | | | | | | | |
|---|---|---|---|---|---|---|---|
| D/C | CPT | | ACK_SN | | | | Oct 1 |
| ACK_SN | | | | | | | Oct 2 |
| ACK_SN | | | | E1 | | | Oct 3 |
| NACK_SN | | | | | | | Oct 4 |
| NACK_SN | | | | | | | Oct 5 |
| E1 | E2 | E3 | NACK_SN | | | | Oct 6 |
| NACK_SN | | | | | | | Oct 7 |
| NACK_SN | | | | E1 | E2 | | Oct 8 |
| E3 | SOstart | | | | | | Oct 9 |
| SOstart | | | | | | | Oct 10 |
| SOend | | | | | | | Oct 11 |
| SOend | | | | | | | Oct 12 |
| NACK_SN | | | | | | | Oct 13 |
| NACK_SN | | | | | | | Oct 14 |
| E1 | E2 | E3 | SOstart | | | | Oct 15 |
| SOstart | | | | | | | Oct 16 |
| SOstart | | | SOend | | | | Oct 17 |
| SOstart | | | | | | | Oct 18 |
| SOstart | | | NACK_Length | | | | Oct 19 |
| NACK_Length | | | NACK_SN | | | | Oct 20 |
| NACK_SN | | | | | | | Oct 21 |
| NACK_SN | | | | E1 | E2 | | Oct 22 |
| E3 | NACK_Length | | | | | | Oct 23 |
| NACK_SN | | | | | | | Oct 24 |
| NACK_SN | | | | | | | Oct 25 |
| ... | | | | | | | |

FIG. 8

| | | | | |
|---|---|---|---|---|
| D/C | CPT | | ACK_SN | Oct 1 |
| ACK_SN | | | | Oct 2 |
| ACK_SN | | | E1 | Oct 3 |
| NACK_SN | | | | Oct 4 |
| NACK_SN | | | | Oct 5 |
| | NACK_Length | | | Oct 6 |
| E1 | E2 | NACK_SN | | Oct 7 |
| NACK_SN | | | | Oct 8 |
| NACK_SN | | NACK_Length | | Oct 9 |
| NACK_Length | | E1 | E2 | Oct 10 |
| SOstart | | | | Oct 11 |
| SOstart | | | | Oct 12 |
| SOend | | | | Oct 13 |
| SOend | | | | Oct 14 |
| NACK_SN | | | | Oct 15 |
| NACK_SN | | | | Oct 16 |
| ... | | | | |

FIG. 9

| Value | Description |
|---|---|
| 000 | STATUS PDU - Type 1 |
| 001 | STATUS PDU - Type 2 |
| 010-111 | reserved |

FIG. 21

| 3-Byte | 2-Byte | 2-Byte | 3-Byte | 2-Byte | LCID=3 | LCID=3 | LCID=3 | LCID=4 | LCID=4 |
|---|---|---|---|---|---|---|---|---|---|
| Subheader LCID=3, C=0 | Subheader C=0 | Subheader C=1 | Subheader LCID=4, C=0 | Subheader E=0 | MAC SDU | MAC SDU | MAC SDU | MAC SDU | MAC SDU |
| 2110 | 2120 | 2130 | 2140 | 2150 | 2160 | 2170 | 2180 | 2190 | 2195 |

FIG. 22

| R | C | E | LCID |
|---|---|---|------|
| R | R | R | Length |
| Length ||||

R/C/E/LCID/R/R/R/Length
3B-Subheader

FIG. 23

| R | C | E | Length |
|---|---|---|--------|
| Length ||||

R/C/E/Length
2B-Subheader

FIG. 24B

| Subhdr LCID=1 | SDU | Subhdr LCID=1 | SDU | Subhdr LCID=1 | SDU | ... | Subhdr LCID=1 | SDU |
|---|---|---|---|---|---|---|---|---|
| 3B | | 3B | | 3B | | 3B | 3B | |

MAC PDU Format (xDL/UL-SCH)

FIG. 24C

| R | R | E | LCID |
|---|---|---|---|
| R | R | R | Length |
| Length ||||

R/R/E/LCID/R/R/R/Length
3B-Subheader

METHOD AND APPARATUS FOR TRANSMITTING AND RECEIVING DATA IN A COMMUNICATION SYSTEM

CROSS-REFERENCE TO RELATED APPLICATION(S)

This application is a continuation application of prior application Ser. No. 16/543,031, filed on Aug. 16, 2019, which is a continuation application of prior application Ser. No. 15/471,554, filed Mar. 28, 2017, which has issued as U.S. Pat. No. 10,396,942 on Aug. 27, 2019, which was based on and claimed priority under 35 U.S.C. § 119(e) of a U.S. Provisional application No. 62/314,661, filed on Mar. 29, 2016, and of a U.S. Provisional application No. 62/324,041, filed on Apr. 18, 2016, and of a U.S. Provisional application No. 62/327,076, filed on Apr. 25, 2016 in the U.S. Patent and Trademark Office, the disclosure each of which is incorporated by reference herein in their entireties.

TECHNICAL FIELD

The present disclosure relates to a communication system. More particularly, the present disclosure relates to a method and apparatus for transmitting and receiving data in a communication system.

BACKGROUND

To meet the demand for wireless data traffic, the wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase a transmission distance, beamforming, a massive multiple-input multiple-output (MIMO), full dimensional MIMO (FD-MIMO), an array antenna, an analog beam forming, and large scale antenna techniques are discussed in the 5G communication systems.

In addition, in the 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, according to the related art, when a receiver does not receive data (or packet), the receiver may transmit a sequence number (NACK SN) of data which is not received to a transmitter by including the sequence number in status report information (status report or status protocol data unit (PDU)). At this point, if the receiver does not receive a large amount of data, a large amount of NACK SN should be included in the status report information. As such, if a large number of NACK SN are included in the status report information, system performance may be affected. Therefore, there is a need for a method of efficiently transmitting status report information.

In addition, the related art may allocate the sequence number to a packet after all radio link control (RLC) service data units SDUs are combined (connected) by a concatenation function or segmented. That is, after the information of the RLC PDU is completely defined, the sequence number may be allocated. Therefore, user equipment (UE) needs to be allocated uplink resources from a base station upon an uplink transmission and process RLC processing after an actual transmission time from a completion of logical channel priority allocation, which may lead to an increase in a real time processing burden of the UE. Therefore, a method for reducing real-time throughput of the UE is needed.

Further, when functions of the base station are distributed and implemented in a central unit (CU) and an access unit (AU or a distributed unit (DU)), a method for performing, by the CU, sequence numbering and automatic retransmission request (ARQ) of the RLC, and by the AU, segmentation and concatenation is impossible. This is because the segmentation and concatenation need to be performed after the sequence numbering. Therefore, there is a need for a method for increasing the degree of freedom of segmentation upon segmentation of the CU and the AU.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an efficient transmission of status report information.

Accordingly, various embodiments of the present disclosure are directed to the provision of a reduction in real-time throughput of user equipment (UE).

Accordingly, various embodiments of the present disclosure are directed to the provision of an increase in a degree of freedom of implementation upon segmentation of central unit (CU) and access unit (AU) segmentation of a base station.

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method of a receiver in a wireless communication system is provided. The method includes receiving at least one packet, identifying whether there is a non-received packet among the at least one packet, and transmitting status report information when there is the non-received packet, in which the status report information may include a field indicating whether there are consecutively non-received packets.

In accordance with another aspect of the present disclosure, a method of a transmitter in a wireless communication system is provided. The method includes transmitting at least one packet, and receiving status report information when there is a packet not received by a receiver among the at least one packet, in which the status report information may include a field indicating whether there are consecutively non-received packets.

In accordance with another aspect of the present disclosure, a receiver in a wireless communication system is provided. The receiver includes a transceiver configured to transmit and receive a signal, and at least one processor configured to receive at least one packet, identify whether there is a non-received packet among the at least one packet, and transmit status report information when there is the non-received packet, in which the status report information may include a field indicating whether there are consecutively non-received packets.

In accordance with another aspect of the present disclosure, a transmitter in a wireless communication system is provided. The transmitter includes a transceiver configured to transmit and receive a signal, and at least one processor configured to transmit at least one packet, and receive status report information whether there is a packet not received by a receiver among the at least one packet, in which the status report information may include a field indicating whether there are consecutively non-received packets.

In accordance with another aspect of the present disclosure, a method of a receiver in a wireless communication system is provided. The method includes receiving a first packet in a first layer from a second layer, generating a second packet using a header including first information indicating whether the first packet is segmented and second information indicating whether the segmented first packet is a last packet, and transmitting the second packet to a third layer.

In accordance with another aspect of the present disclosure, a receiver in a wireless communication system is provided. The receiver includes a transceiver configured to transmit and receive a signal, and at least one processor configured to receive a first packet in a first layer from a second layer, generate a second packet using a header that includes first information indicating whether the first packet is segmented and second information indicating whether the segmented first packet is a last packet, and transmit the second packet to a third layer.

Other aspects, advantages, and salient features of the disclosure will become apparent to those skilled in the art to from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a diagram illustrating a detailed format of an RLC PDU according to an embodiment of the present disclosure;

FIGS. 7A and 7B are diagrams illustrating another example of a STATUS PDU according to an embodiment of the present disclosure;

FIG. 8 is a diagram illustrating another example of a STATUS PDU according to an embodiment of the present disclosure;

FIG. 9 is a diagram illustrating a method for setting a STATUS PDU according to an embodiment of the present disclosure;

FIG. 21 is a diagram illustrating a structure of a packet with which a MAC subheader according to an embodiment of the present disclosure;

FIG. 22 is a diagram illustrating a format of a MAC subheader according to an embodiment of the present disclosure;

FIG. 23 is a diagram illustrating another format of a MAC subheader according to an embodiment of the present disclosure;

FIGS. 24B and 24C are diagrams illustrating a packet having a MAC subheader having a fixed size according to an embodiment of the present disclosure;

Throughout the drawings, like reference numerals will be understood to refer to like parts, components, and structures.

DETAILED DESCRIPTION

Figure 1:
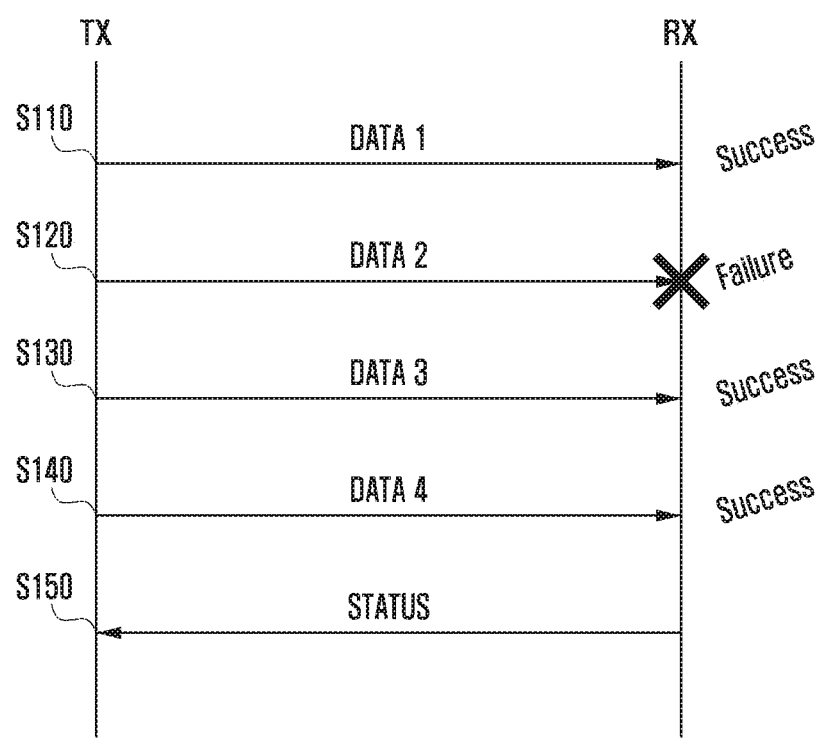
FIG. 1 is a diagram illustrating a status report according to a data transmission according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses generate means for performing functions described in each block of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in each block of the flow chart. Since the computer program instructions may also be mounted on the computer or the other programmable data processing apparatuses, the instructions performing a series of operations on the computer or the other programmable data processing apparatuses to generate processes executed by the computer, thereby executing the computer or the other programmable data processing apparatuses may also provide operations for performing the functions described in each block of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are consecutively shown may be simultaneously performed in fact or be performed in a reverse sequence depending on corresponding functions sometimes.

Here, the term '-unit' used in the present embodiment means software or hardware components such as field-programmable gate arrays (FPGA) and application-specific integrated circuit (ASIC) and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the 'units' may be combined with a smaller number of components and the 'units' or may further separated into additional components and 'units'. In addition, the components and the 'units' may also be implemented to reproduce one or more CPUs within a device or a security multimedia card.

Further, in the drawings illustrating a method in embodiments, the order of description does not necessarily correspond to the order of execution, and the order relationship may be changed or executed in parallel.

In addition, the present disclosure describes, by way of example, a case of a wireless communication system for convenience of explanation, but the content of the present disclosure may also be applied to a wired communication system.

FIG. 1 is a diagram illustrating a status report according to a data transmission according to an embodiment of the present disclosure.

Referring to FIG. 1, a transmitter may transmit four pieces of data to a receiver in operations S110 to S140.

At this point, it is assumed that the receiver does not receive data 2. The receiver may transmit a status message indicating whether or not the data was successfully transmitted to the transmitter in operation S150. Specifically, the receiver does not receive the data 2, and therefore may transmit a sequence number (SN) for data that are not received to the transmitter by including the sequence number in a status information message.

The process may be referred to as an automatic repeat request (ARQ) in a communication system.

According to an embodiment of the present disclosure, the transmitter may mean user equipment (UE) in an uplink transmission and mean a base station in a downlink transmission. The transmitter may mean the UE in the uplink transmission and mean the base station in the downlink transmission. Likewise, the receiver may mean the base station in the uplink transmission and the UE in the downlink transmission. Further, the present disclosure may be applied to both the uplink transmission and the downlink transmission, and the transmitter and the receiver described in the present disclosure may each include both the UE and the base station.

Figure 2:
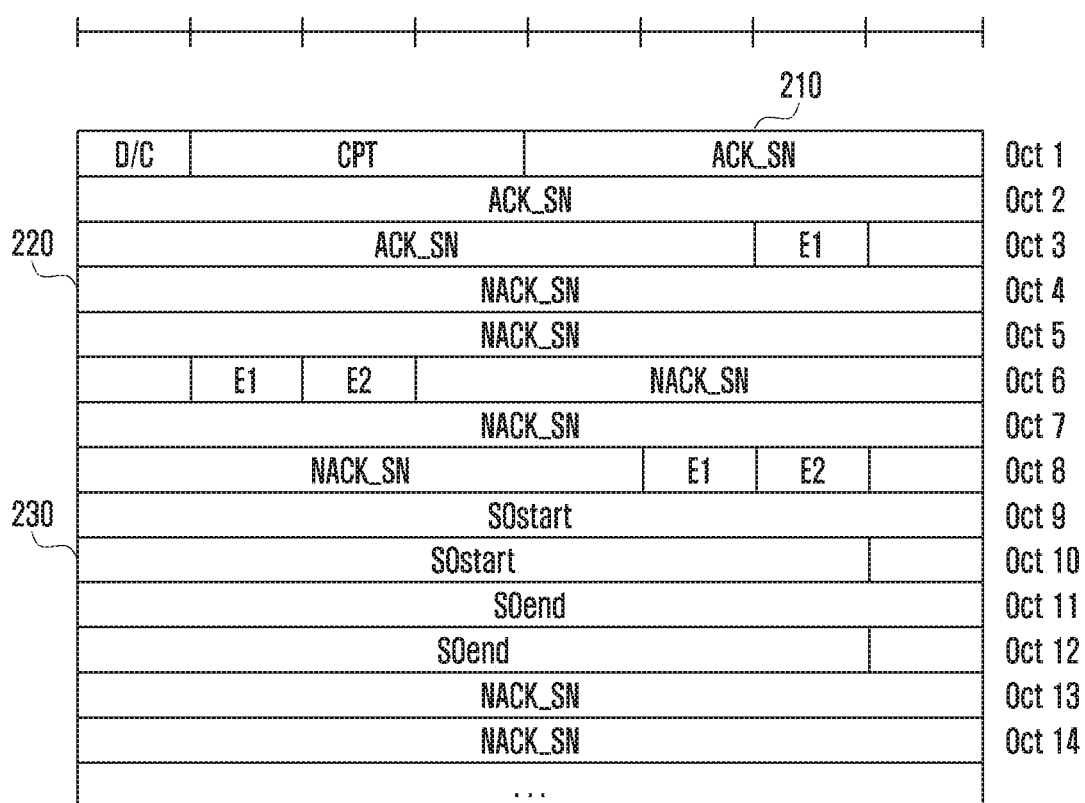
FIG. 2 is a diagram illustrating a format of status report information according to an embodiment of the present disclosure.

FIG. 2 is a diagram illustrating a format of status report information according to an embodiment of the present disclosure.

Referring to FIG. 2, the status report information may have a form of data (hereinafter, referred to as protocol data unit (PDU)) generated for transmission in the corresponding layer. For example, data generated for transmission in a radio link control (RLC) layer may be referred to as an RLC PDU. Further, the status report information may be referred to as STATUS PDU.

The receiver may include a SN of data successfully received in an ACK_SN field 210 of the STATUS PDU. In addition, if data is not received, the receiver may transmit the SN of the data to the transmitter by inserting the SN of the data into a NACK_SN field 220 of the STATUS PDU.

In the long-term evolution (LTE)/LTE-advanced (LTE-A) system, an RLC sublayer may request a retransmission request (ARQ), and the used SN may also use an SN allocated in the RLC layer.

In addition, even a packet data convergence protocol (PDCP) sublayer may also perform some of functions of transmitting the STATUS PDU and performing the retransmission during re-establishment in addition to handover.

Further, in the RLC, a service data unit (SDU) or PDU which is data transmitted from a higher layer may be segmented and transmitted. In this case, the RLC is required to indicate segment information in the STATUS PDU for efficient retransmission.

Accordingly, the receiver may indicate a segmented point using SOstart and SOend fields 230 of the STATUS PDU. Specifically, the SOstart field may include information related to a start point of the segmented packet and the SOend field may include information related to an end point of the segmented packet.

Figure 3:
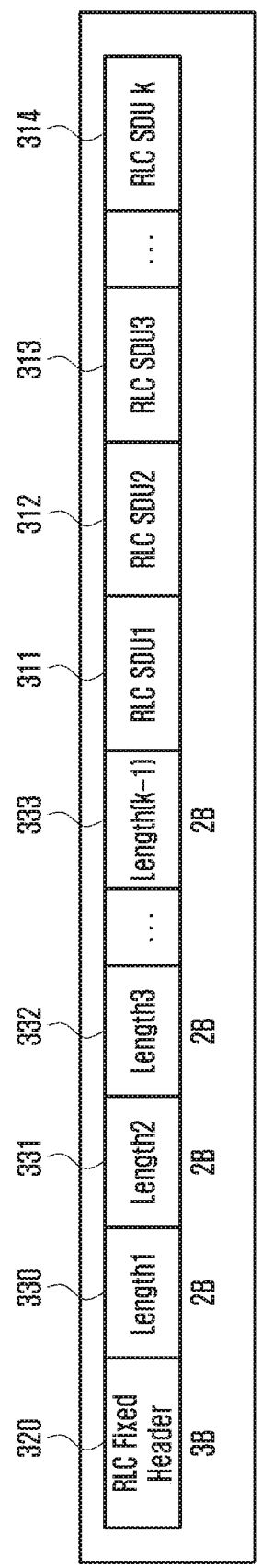
FIG. 3 is a diagram illustrating a radio link control (RLC) protocol data unit (PDU) format generated through a concatenation process according to an embodiment of the present disclosure.

FIG. 3 is a diagram illustrating an RLC PDU format generated by a concatenation process according to an embodiment of the present disclosure.

As described above, the RLC PDU may mean a layer created for transmission in the RLC layer and the RLC SDU may mean the data transmitted from the higher layer of the RLC layer or data received from the RLC layer.

Referring to FIG. 3, in the case of the LTE, the RLC layer of the UE receives at least one RLC SDU and may generate one RLC PDU with which a plurality of RLC SDUs are combined by the concatenation process.

That is, a single RLC PDU may consist of at least one RLC SDU 311 to 314.

In addition, a header 320 may be located at a head of the RLC PDU and a length of the header may be fixed.

In addition, the RLC layer may indicate each length of k−1 SDUs excluding the last k-th SDU 314 in length fields (Lengths 330 to 333) between the fixed header 320 of the RLC PDU and the SDU.

When an 18-bit SN of the LTE is used, a size of the header is 3 bytes and a size of the length field (hereinafter, LI field) is 2 bytes.

The detailed format of the specific RLC PDU will be described with reference to FIG. 4.

FIG. 4 is a diagram illustrating a detailed format of the RLC PDU according to an embodiment of the present disclosure.

Referring to FIG. 4, a D/C field is a part indicating whether or not the PDU is a data PDU or a control PDU. For example, when the D/C field is represented by 1, the data PDU may be indicated and when the D/C field is represented by 0, the control PDU may be indicated.

An RF field may indicate whether or not the PDU is resegmented, it may indicate whether or not a P field is polled to request the STATUS PDU to the receiver, it may indicate whether or not an FI field is segmented, an E field may indicate whether or not an LI field is added later, it may indicate whether or not an LSF field is the last segment in the PDU when being resegmented, an R1 field may indicate a reserved field, an SN field may indicate a sequence number, and an LI field may indicate a length of the following SDU. At this point, the LI field for the last SDU may be omitted, and in the case of the LTE, a plurality of SDUs may be included in a single PDU by the concatenation function.

As described above, when a large number of data is not received, a large number of NACK SNs needs to be included in the STATUS PDU. When the concatenation is performed to generate one PDU by combining a plurality of SDUs, the above-mentioned method may be efficient, but when the concatenation is not performed, the larger the number of NACK SNs included in the STATUS PDU, the more the system performance may be affected. Alternatively, the number of ACK SNs to be reported may increase when a bitmap is used for retransmission in the PDCP sublayer. Therefore, a method for efficiently transmitting a STATUS PDU is proposed below.

Figure 5:
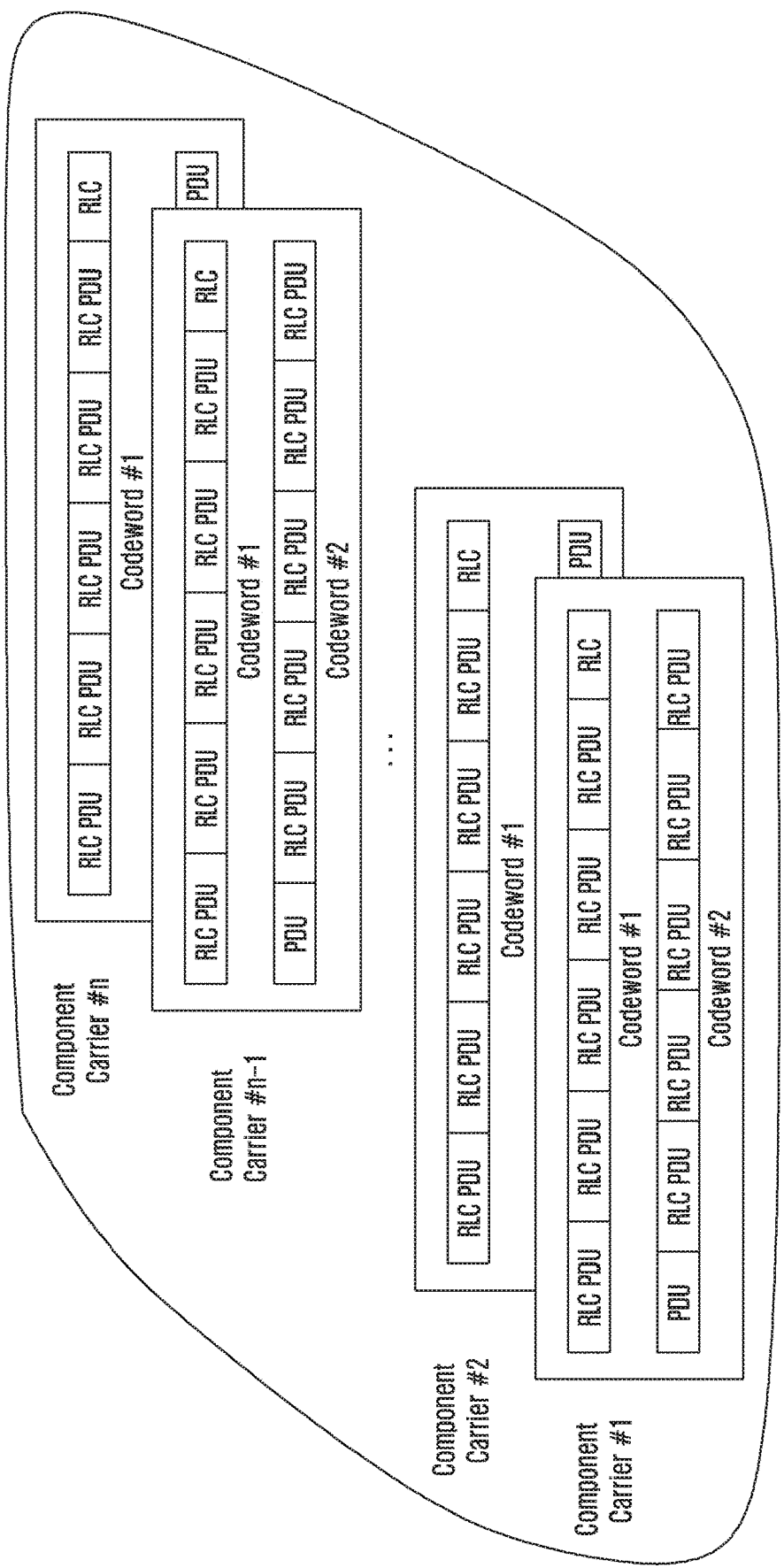
FIG. 5 is a diagram illustrating a reason why a plurality of data is not received according to an embodiment of the present disclosure.

FIG. 5 is a diagram illustrating an example of performing a high-speed transmission according to an embodiment of the present disclosure.

When supporting high-capacity, high-speed communication, the transmitter may simultaneously transmit a plurality of data packets in one transmission.

Referring to FIG. 5, the transmitter may transmit a plurality of data packets (RLC PDUs) for 1-transmission time interval (TTI) that is one scheduling interval. In addition, when a carrier aggregation (hereinafter, CA) technique is used, the transmitter may transmit data packets using a plurality of component carriers (CCs) simultaneously. Further, the transmitter may transmit a plurality of data packets received from the RLC and PDCP layers, which are higher layers, through the respective element carriers.

Typically, in the RLC layer, the concatenation to make a plurality of PDCP PDUs (or RLC SDUs) into one RLC PDU may be performed. In the medium access control (MAC) layer, multiplexing to make one or a plurality of RLC PDUs (MAC SDUs) into one MAC PDU together with a MAC control element (hereinafter, CE) may be performed.

However, the concatenation function of the RLC layer may be omitted in order to reduce the processing of the transmitter when the high-speed transmission is required. In this case, as in the embodiment of FIG. 5, in the MAC sublayer, the plurality of RLC PDUs (MAC SDUs) form one MAC PDU.

FIG. 5 illustrates an example in which 11 RLC PDUs for each component carrier are transmitted in two codewords for the 1-TTI. At this point, the number of RLC SDUs may be changed depending on a channel status and setting of a network. If the entire data packet is lost due to a sudden deterioration in a channel situation in a specific TTI, etc., the NACK may be generated by multiplying the number of component carriers by the number of RLC SDUs included in one component carrier during the 1-TTI. Therefore, the SN corresponding to the NACK is likely to be a consecutive number, and at the same time, if a plurality of NACKs are generated, the number of SNs reported as the NACK increases, which may lead to the performance degradation of the system.

Further, referring to FIG. 11 as described below, since the RLC SDUs are allocated the respective sequence numbers by omitting the concatenation process and combining the fixed header with the RLC SDU to generate the RLC PDU, a plurality of consecutive NACKs may be generated upon the failure of the transmission.

Accordingly, when the plurality of consecutive NACKs are generated, an efficient method of transmitting an SN corresponding to NACK to a transmitter is required. In the case of the current LTE, the RLC sublayer serves to transmit the SN corresponding to the NACK.

In the RLC layer, the ACK and NACK information may be transmitted by being included in the STATUS PDU. In the present disclosure, the content is described on the assumption that the transmission is performed in the RLC sublayer, but the content of the present disclosure is not limited to the RLC sublayer. For example, even the PDCP sublayer may be responsible for the retransmission upon the re-establishment, and the PDCP sublayer may be responsible for the ARQ operation under the general situation performed in the RLC.

Figure 6A:
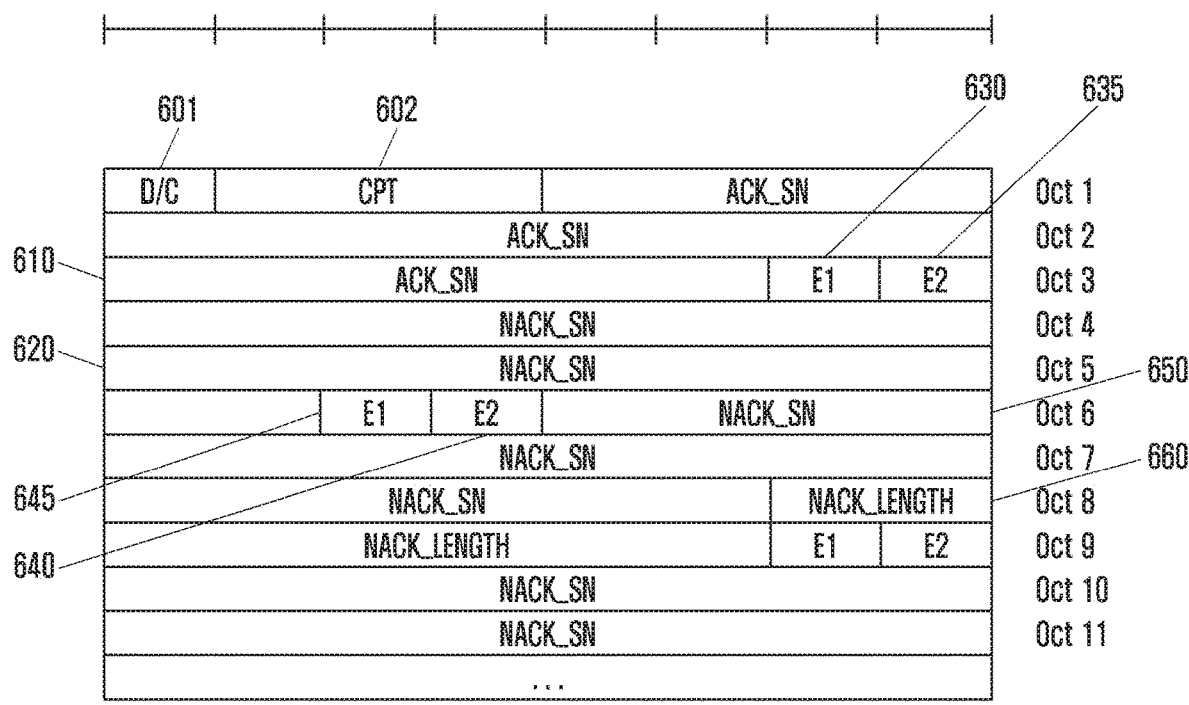
FIGS. 6A and 6B are diagrams illustrating a STATUS PDU according to an embodiment of the present disclosure.
Figure 6B:
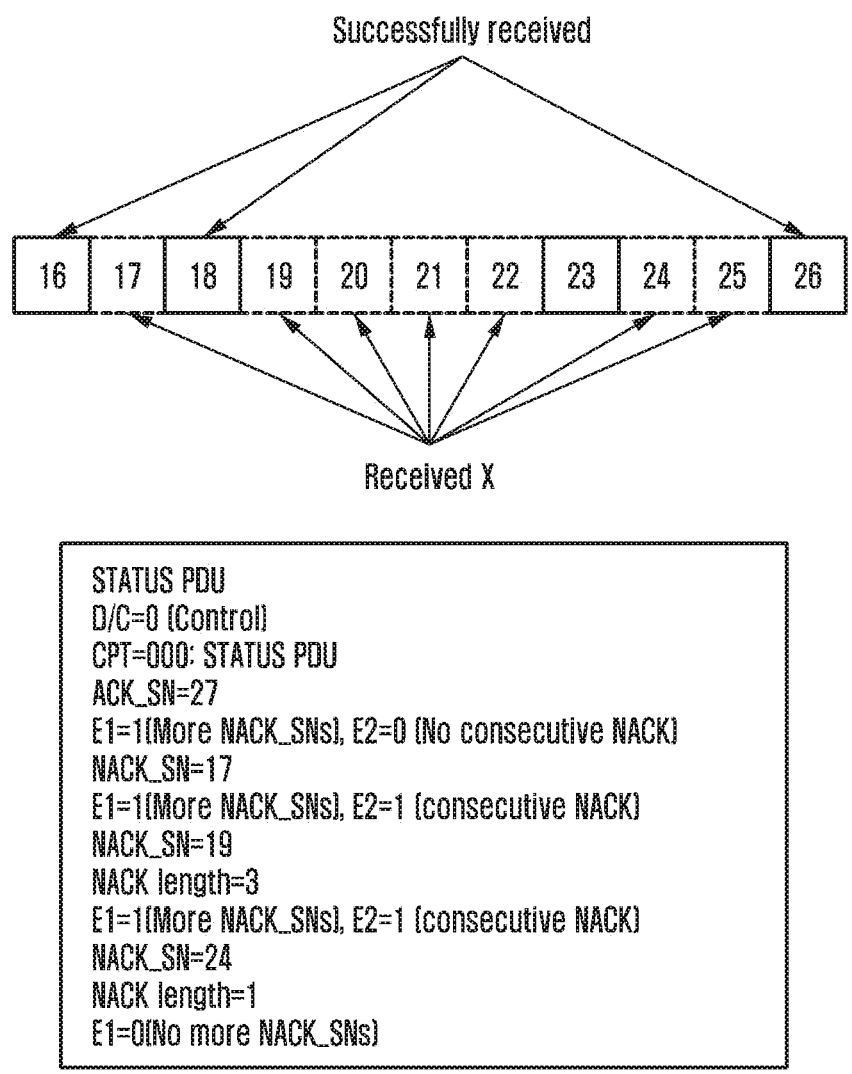

FIGS. 6A and 6B are diagrams illustrating the STATUS PDU according to an embodiment of the present disclosure.

Referring to FIG. 6A, the STATUS PDU does not include the NACK SNs for the respective data packets not received, a length field (hereinafter, referred to as a NACK length field) indicating the number of NACK SNs, and a field (hereinafter, E2 field) indicating whether or not there is the length field.

Accordingly, if an E2 field 640 has a particular value (e.g., 1), then an NACK length field 660 is activated and the NACK length field 660 may indicate how many NACK SNs are located based on an NACK SN field 650.

At this point, the NACK SN field 650 may be set to any one value of the SNs of the data packet in which the consecutive NACKs are generated. For example, the NACK SN field 650 may be set to the SN of the first or last data packet of the data packets in which the consecutive NACKs are generated.

In addition, the NACK length field 660 may be set to a value obtained by subtracting 1 from the number of consecutive NACK SNs or the number of NACK SNs. The NACK length field 660 may be set by various methods according to the embodiment.

In addition, the information included in the STATUS PDU is as follows.

A PDU type information field (hereinafter, D/C field) is a value indicating whether or not the PDU is the control PDU or the data PDU, and the STATUS PDU may be set to the control PDU.

A control PDU type information field (hereinafter, control PDU type (CPT) field) may indicate the type of the control PDU. For example, the STATUS PDU may be set to 000.

The ACK SN field may indicate the SN of the packet that the receiver successfully receives. At this point, the ACK SN field may be set to a value obtained by adding 1 to the SN value of the packet successfully received.

The E1 field may indicate whether or not an additional NACK SN is included later. For example, if the E1 field is activated or has a particular value, it may indicate that the additional NACK SN is included.

Referring to FIG. 6B, a situation where the STATUS PDU for the information needs to be transmitted is illustrated, since packets Nos. 16, 18, 23, and 26 among packets from No. 16 to No. 26 are successfully received at a transmission time of the STATUS PDU and the remaining packets are not received.

In this case, each field of the STATUS PDU may be set as follows. At this point, for convenience of description, in the present embodiment, it is assumed that the information of FIG. 6B is described in the STATUS PDU configured as illustrated in FIG. 6A. However, as described below, locations of the fields E1 and E2 may be changed.

Further, the values of the fields described below are merely one example, and therefore may be changed. Referring to FIG. 6B, a D/C field 601 may be set to 0 indicating the control PDU.

A CPT field 602 may be set to 000 indicating the STATUS PDU.

An ACK SN field 610 may be set to 27 obtained by adding 1 to 26 that is the sequence number of the most recently successfully received packet.

However, the above-mentioned field values are only an example of an embodiment of the present disclosure. For example, if the D/C field 601 is set to 1, it may indicate the control PDU, and the CPT field 602 may also be set to another value to indicate the STATUS PDU. Further, the ACK SN field 610 may be set to the sequence number of the most recently successfully received packet or may be set to another value generated using the sequence number.

Since there are the packets that are not received, an E1 field 630 may be set to 1. Further, since there are consecutively non-received packets after packet No. 17 that is a packet not first received, an E2 field 635 may be set to 0. Accordingly, if the E2 field 635 is set to 0, it may mean that there is no NACK length field.

Further, an NACK SN field 620 may be set to 17 that is the sequence number of the packet not first received.

As illustrated in FIG. 6A, the E1 field 630 and the E2 field 635 may be located between the ACK field 610 and the NACK SN field 620 or may be located after the ACK field and the NACK field.

In addition, packets that are not subsequently received are packets from No. 19 to No. 22. Accordingly, since there are no packets that are not received, an E1 field 645 may be set to 1. Further, since there are consecutively non-received packets from packet No. 19 to packet No. 22, the E2 field 640 may be set to 1. Therefore, it may mean that there is a NACK length field later.

Further, the NACK SN field 650 may be set to 19 that is a SN of a first packet among the consecutively non-received packets. However, an embodiment of the present disclosure is not limited thereto and may be set to 22 which is the SN of the packet not last received.

In addition, the NACK length field 660 may be set to a number of consecutively non-received packets (the number of consecutive NACK SNs) or a value obtained by subtracting 1 from the number of consecutively non-received packets.

The present embodiment describes, by way of example, that there are four packets that are not received from the packet No. 19 to the packet No. 22 and the NACK length field 660 is set to 3 that is a value obtained by subtracting 1 from the number of consecutively non-received packets. However, this is only an embodiment of the present disclosure and the NACK length field 660 may be set to 4 or may be set according to a predefined rule between the transmitter and the receiver.

Hereinafter, the packets that are not received are packets from No. 24 to No. 25. Accordingly, since there are no packets that are not received, the E1 field may be set to 1. Further, since there are consecutively non-received packets from packet No. 24 to packet No. 25, the E2 field may be set to 1. Accordingly, it may mean that there is the NACK length field later.

Further, the NACK SN field may be set to 24 that is the SN of the first packet among the consecutively non-received packets. However, an embodiment of the present disclosure is not limited thereto and may be set to 25 which is the SN of the packet not last received.

In addition, the NACK length field may be set to a value obtained by subtracting 1 from the number of consecutively non-received packets (the number of consecutive NACK SNs).

The present embodiment describes, by way of example, that there are two packets that are not received from packet No. 24 to packet No. 25 and the NACK length field is set to 1 that is a value obtained by subtracting 1 from the number of consecutively non-received packets. However, this is only an embodiment of the present disclosure and the NACK length field may be set to 2 or may be set according to a predefined rule between the transmitter and the receiver.

Further, there is no packet that has not been received after that, and therefore the E1 field may be set to zero.

Figure 7B:
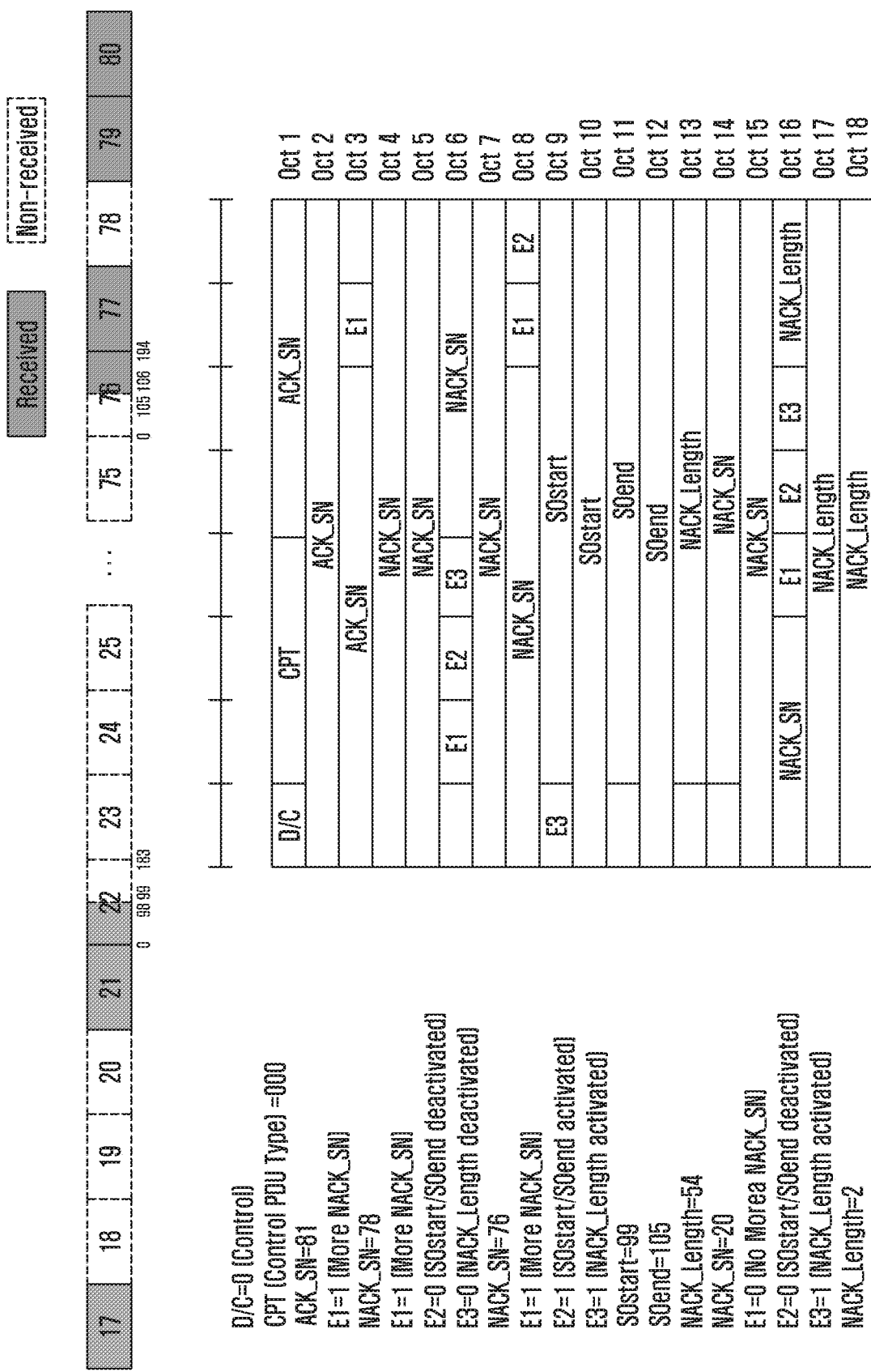

FIGS. 7A and 7B are diagrams illustrating an example of a STATUS PDU according to an embodiment of the present disclosure.

Referring to FIG. 7A, the STATUS PDU includes the NACK length field indicating the number of consecutive NACK SNs and a field (hereinafter, E3 field) indicating whether or not there is the NACK length field.

Accordingly, if the E3 field has a particular value (e.g., 1), the NACK length field is activated and the NACK length field may indicate how many NACK SNs are located based on the NACK SN field.

At this point, the NACK SN field may be set to any one value of the SNs of the data packet in which the consecutive NACKs are generated. For example, the NACK SN field may be set to the SN of the first or last data packet of the data packets in which the consecutive NACKs are generated.

In addition, the NACK length field may be set to a value obtained by subtracting 1 from the number of consecutive NACK SNs or the number of NACK SNs. The NACK length field may be set by various methods according to the embodiment.

The present embodiment is characterized in that, unlike FIG. 6A, a field (hereinafter, E2 field) indicating whether or not an upper PDU or an SDU is segmented is included in the STATUS PDU. Accordingly, when the E2 field has a particular value (e.g., 1), a segmentation offset start field (hereinafter, segmentation offset (SO) field) and a segmentation offset end field (hereinafter, SOend field) may be activated.

Therefore, when the E2 field and the E3 field are activated simultaneously, the SOstart field may indicate a non-received start point corresponding to the head NACK SN. That is, the SOstart field may indicate the location where the first packet among the consecutively non-received packets is segmented. Further, the SOend field may indicate a non-received end point corresponding to the tail NACK SN. That is, the SOend field may indicate a location where the last packet of the consecutively non-received packets is segmented. As described above, the SOstart field and the SOend field may indicate each location where different packets are segmented.

Meanwhile, when only the E2 field is activated, the SOstart field may indicate the start point of the segmentation in the same packet and the SOend field may indicate the end point of segmentation in the same packet.

In addition, the information included in the STATUS PDU is the same as described above and is omitted in the following description.

FIG. 7B illustrates an example of the STATUS PDU. FIG. 7B illustrates the situation that packets from No. 17 to No. 80 are transmitted, SNs of packets successfully received are 17, 21, 77, 79, and 80, a SNs of packets partially received are 22 (0 to 98 bytes) and 76 (106 to 194 bytes), and packets Nos. 18 to 20, packet No. 22 (a portion) to packet No. 76 (a portion), and packet No. 78 are not received. In this case, each field of the STATUS PDU may be set as follows.

Further, the values of the fields described below are merely one example, and therefore may be changed.

Referring to FIG. 7B, the D/C field may be set to 0 indicating the control PDU.

The CPT field may be set to 000 indicating the STATUS PDU.

The ACK SN field may be set to 81 obtained by adding 1 to 80 that is the sequence number of the most recently successfully received packet. However, the above-mentioned field values are only an example of an embodiment of the present disclosure. For example, if the D/C field is set to 1, it may indicate the control PDU, and the CPT field may also be set to another value to indicate the STATUS PDU. Further, the ACK SN field may be set to the sequence number of the most recently successfully received packet or may be set to another value generated using the sequence number.

Further, since there are no packets that are not received, the NACK needs to be included later, and therefore the E1 field may be set to 1. In the embodiments of FIGS. 7A and 7B, the first E1 field only indicates whether or not there is the first NACK_SN field, and there are no E2 and E3 fields.

Further, the NACK SN field may be set to 78 that is one of the SNs of the packets not received. The NACK_SN fields need not have a specific sequence but the present embodiment is described under the assumption that the NACK_SN fields are arranged in a descending order.

Further, since there are packets that are not received, the E1 field may be set to 1. Further, since packet No. 78 is not consecutively received, E2 and E3 may be set to 0.

Further, the subsequent NACK SN may be set to 76. Further, the E1 field may be set to 1 because there are packets (Nos. 18 to 20) that are not received later.

Further, packets Nos. 22 to 76 are consecutively non-received packets, and therefore the E3 field may be set to 1. Further, packet No. 22 and packet No. 76 are partially received, and therefore the E2 field may be set to 1 to activate the SOend field and the SOend field.

Further, the SOstart field may be set to 99 because the packet No. 22 is not received since 99 bytes and the SOend field may be set to 105 since the packet No. 76 are not received up to 105 bytes. Further, the NACK length field may be set to 54 that is the number of packets from No. 22 to No. 75 other than packet No. 76. However, as described above, the NACK length field may be set to the number of consecutively non-received packets. In this case, the NACK length field may be set to 55. Alternatively, the NACK length field may be set to 53 that is the number of packets from No. 23 to No. 75 other than packet No. 76 and packet No. 22.

Further, the subsequent NACK SN field may be set to 20, and the E2 field may be set to zero because there is no packet not partially received. In addition, the E1 field may be set to 0 because packets Nos. 18 to 20 packets are the last packets to be reported.

Further, since there are the consecutively non-received packets, the E3 field may be set to 1 and the NACK length field may be set to 2 in consideration of the packet No. 18 and packet No. 19. However, as described above, the NACK length field may be set to the number of consecutively non-received packets. In this case, the NACK length field may be set to 3. Alternatively, the NACK length field may be set to 1 that is a value obtained by subtracting 2 from the number of consecutively non-received packets. The setting method may be determined according to the appointment of a communication protocol.

FIG. 8 is a diagram illustrating another example of a STATUS PDU according to an embodiment of the present disclosure.

Referring to FIG. 8, the STATUS PDU includes the length field (NACK length) indicating the number of consecutive NACK SNs and the field (E2 field) for activating the SOstart and SOend fields.

According to the present embodiment, the NACK length field may be activated at all times, and it is possible to indicate how many NACK SNs are consecutively located based on the NACK SN field.

At this point, the NACK SN field may be set to any one value of the SNs of the data packet in which the consecutive NACKs are generated. For example, the NACK SN field may be set to the SN of the first or last data packet of the data packets in which the consecutive NACKs are generated.

In addition, the NACK length field may be set to a value obtained by subtracting 1 from the number of consecutive NACK SNs or the number of NACK SNs. The NACK length field may be set by various methods according to the embodiment.

When the E2 field has a particular value (e.g. 1), the SOstart field and the SOend field may be activated.

When the E2 field is activated, the SOstart field may indicate a non-received start point corresponding to the head NACK SN. That is, the SOstart field may indicate the location where the first packet among the consecutively non-received packets is segmented. Further, the SOend field may indicate a non-received end point corresponding to the tail NACK SN. That is, the SOend field may indicate a location where the last packet of the consecutively non-received packets is segmented. As described above, the SOstart field and the SOend field may indicate each location where different packets are segmented.

In addition, the information included in the STATUS PDU is the same as described above and is omitted in the following description.

FIG. 9 is a diagram illustrating a method for setting a STATUS PDU according to an embodiment of the present disclosure.

Referring to FIG. 9, when various types of STATUS PDUs are defined, the CPT field may indicate which STATUS PDU is used. The embodiment of FIG. 9 has a plurality of STATUS PDU formats.

For example, when more than two STATUS PDUs are used as the CTP value, a CTP field value 000 may indicate a first type STATUS PDU and 001 may indicate a second type STATUS PDU. At this point, the subject determining the type of the STATUS PDU may select the STATUS PDU type that increases the transmission efficiency or may be instructed a condition for determining the STATUS PDU type from a network in advance.

At this point, the first type STATUS PDU and the second type STATUS PDU may use the format used in LTE or the format of FIGS. 6A, 6B, 7A, 7B and 8 as described above. For example, in any embodiment, the STATUS PDU of FIG. 7A is set as the first type and the bitmap type STATUS PDU of the LTE PDCP is set as the second type, and when the content of the same information is included, the STATUS PDU may also be transmitted as a smaller size of STATUS PDU type.

Further, if the CTP field value is set to be a reserved value, a receiving end may discard the packet received as the value.

Figure 10A:
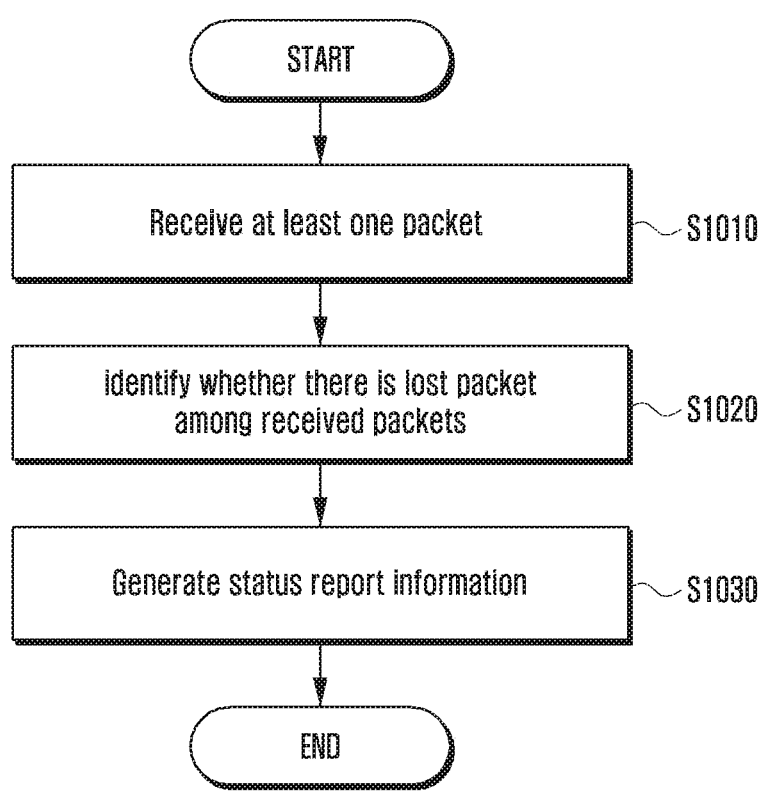
FIGS. 10A, 10BA, 10BB, 10CA, and 10CB, are flow charts illustrating an operation according to an embodiment of the present disclosure.

FIG. 10A is a flow chart illustrating an operation of a UE according to an embodiment of the present disclosure.

Referring to FIG. 10A, in operation S1010, the UE may receive at least one packet. For convenience of explanation in the present disclosure, the operation in the RLC layer will be described by way of example, but the present disclosure may be applied to the PDCP layer or other layers.

The RLC layer of the UE may receive at least one RLC SDU from the higher layer.

Further, in operation S1020, the UE may identify whether or not there is a lost packet in the received packets. The UE may identify whether or not there is a lost packet using the sequence number allocated to the packet.

Further, in operation S1030, the UE may generate status report information based on the identified result.

The UE may generate the status report information including a sequence number of a packet that is not received. At this point, the status report information may include a field indicating whether or not there are the consecutively non-received packets. The field indicating whether or not there are the consecutively non-received packets may mean the same field as the field indicating whether or not there is the above-mentioned length field.

Specifically, if there are the consecutively non-received packets, the status report information may include the length field including information related to the number of consecutively non-received packets. Therefore, if there are the consecutively non-received packets, the length field exists in the status report message and the length field may be activated using the field indicating whether or not there is the length field. The detailed content is the same as those described above and therefore will be omitted below.

Further, if there are the consecutively non-received packets, the status report information may include the information on the segmented parts of different packets. The information may mean, for example, the SOstart field, the SOend field, or the like.

Even when the plurality of NACKs are generated for the data transmission, for consecutively non-received data, the length information is included in the status report information, such that the number of NACK SNs to be included in the status report information may be reduced and the system performance may be improved.

Figure 10B:
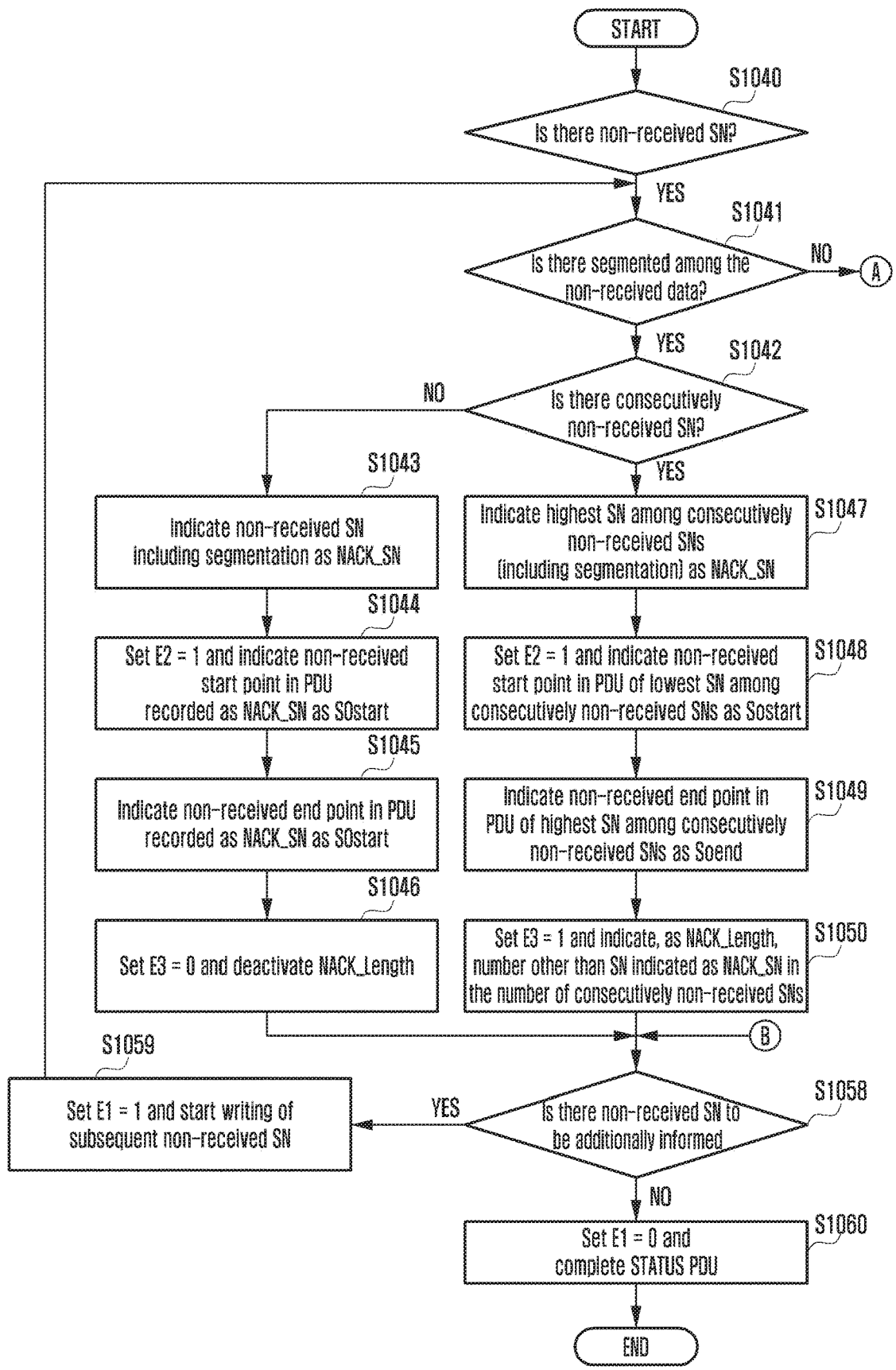
Figure 10B:
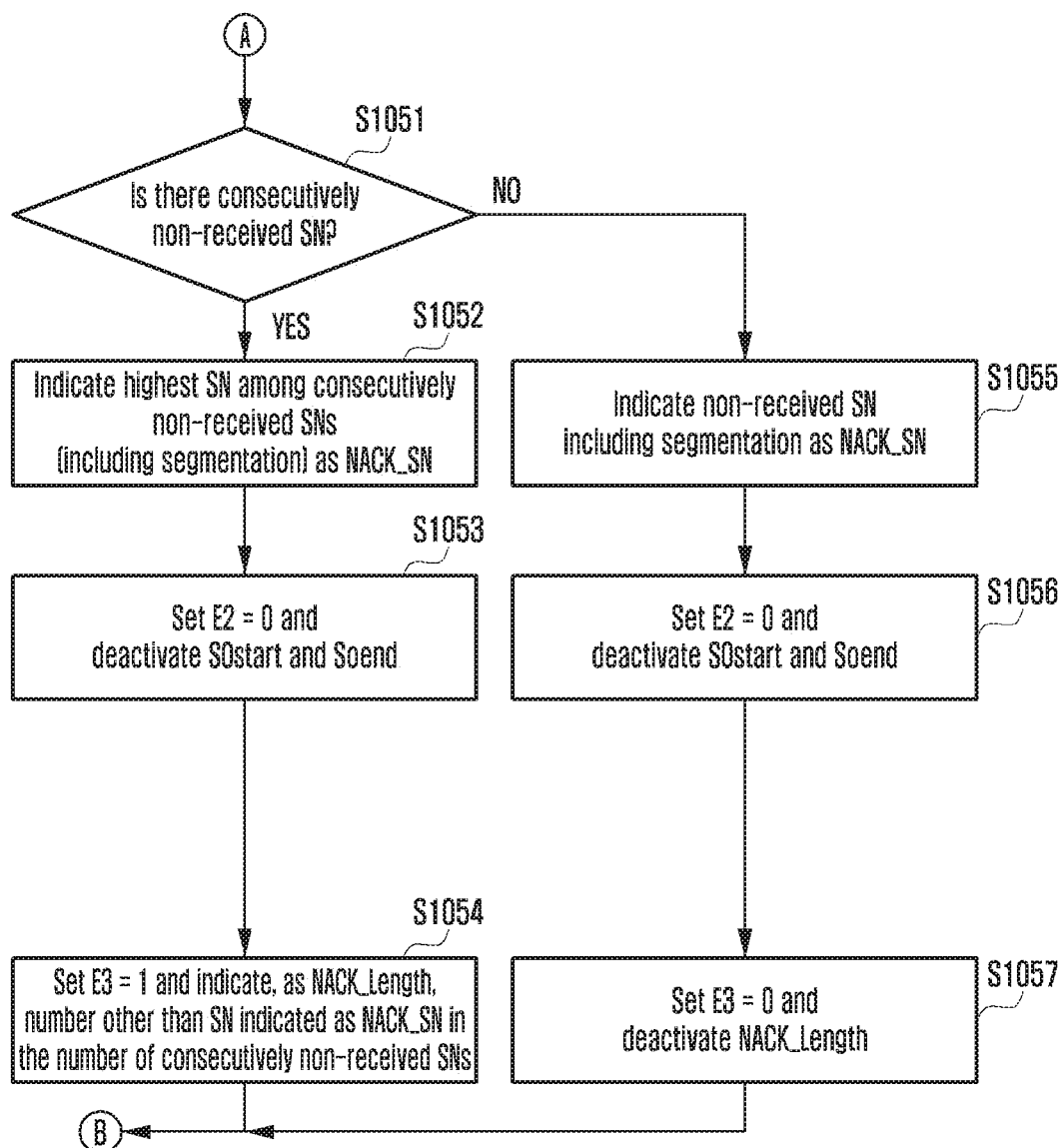

FIGS. 10BA and 10BB are diagrams illustrating a method for generating, by a UE, a STATUS PDU according to an embodiment of the present disclosure.

Referring to FIGS. 10BA and 10BB, the UE may receive data.

In operation S1040, the UE may identify whether or not there is non-received data.

If there is non-received data, in operation S1041, the UE may identify whether or not there is segmented data among the non-received data.

If there is the segmented data, in operation S1042, the UE may identify whether or not the non-received data is the consecutively non-received data.

If the non-received data is the consecutively non-received data, in operation S1043, the UE may indicate the sequence number of the non-received data as the NACK_SN.

Further, since there is the segmented data, in operation S1044, the UE may set E2=1 and indicate the start point of the non-received data as the SOstart.

Further, in operation S1045, the UE may indicate the end time of the non-received data as the SOend.

Further, since the data is not consecutively received, the UE may not use the NACK_length field. Accordingly, in operation S1046, the UE may set E3=0 and deactivate the NACK_length field.

On the other hand, if it is determined in the operation S1042 that the non-received data is the consecutively non-received data, in operation S1047, the UE may indicate the highest sequence number among the consecutive data as the NACK_SN.

Further, since there is the segmented data, in operation S1048, the UE may set E2=1 and indicate, as the SOstart, the start point of the non-received data in data having the lowest sequence number among the non-received data.

Further, in operation S1049, the UE may indicate, as the SOend, the end time of the non-received data in data having the highest sequence number among the non-received data.

Further, since the data is not consecutively received, in operation S1050, the UE may set E3=1 and may indicate, as the NACK_length, the number other than the number of data indicated as the NACK_SN from the number of consecutively non-received data.

If it is determined in the operation S1041 that there is no segmented data among the non-received data, in operation S1051, the UE may check whether or not the non-received data is the consecutively non-received data.

If the non-received data is the consecutively non-received data, in operation S1052, the UE may indicate the highest sequence number among the consecutive non-received data as the NACK_SN.

In addition, since there are no segmented packets, in operation S1053, the UE may set E2=0 and deactivate the SOstart and the SOend.

Further, since the data is not consecutively received, in operation S1054, the UE sets E3=1 and may indicate, as the NACK_length, the number other than the sequence number indicated as the NACK_SN from the number of consecutively non-received data.

If it is determined in the operation S1051 that the non-received data is not the consecutively non-received data, in operation S1055, the UE may indicate the sequence number of the non-received data as the NACK_SN.

In addition, since there are no segmented packets, in operation S1056, the UE may set E2=0 and deactivate the SOstart and the SOend.

Further, since the non-received data is not the consecutively non-received data, the UE may not use the NACK_length field. Accordingly, in operation S1057, the UE may set E3=0 and deactivate the NACK_length field.

Further, in operation 51058, the UE may check whether or not there is non-received data to be additionally notified.

When there is the non-received data to be additionally notified, in operation S1059, the UE may set E1=1 and repeat the process on the subsequent non-received data.

On the other hand, if there is no non-received data, in operation S1060, the UE may set E1=0 and generate the STATUS PDU.

Figure 10C:
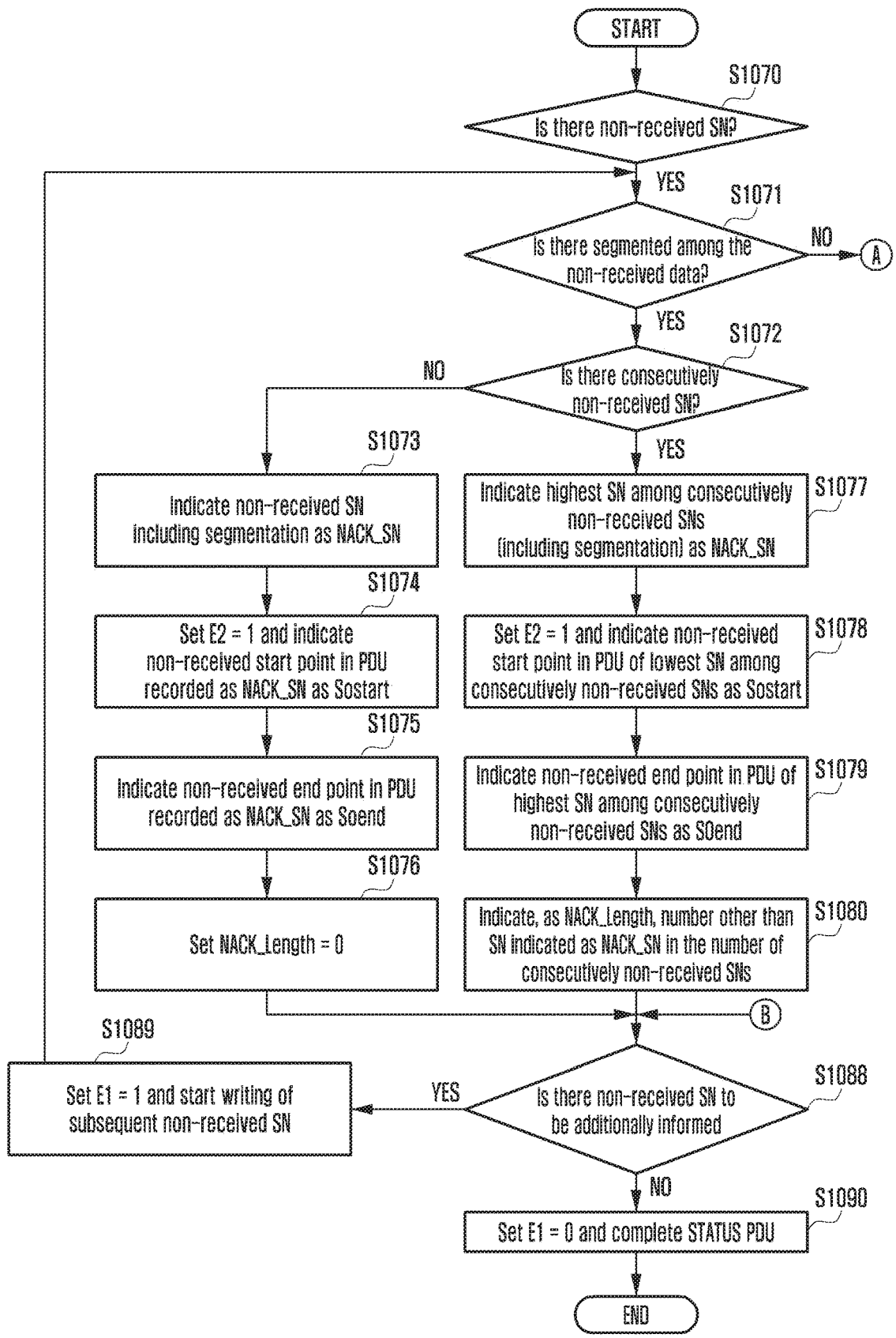
Figure 10C:
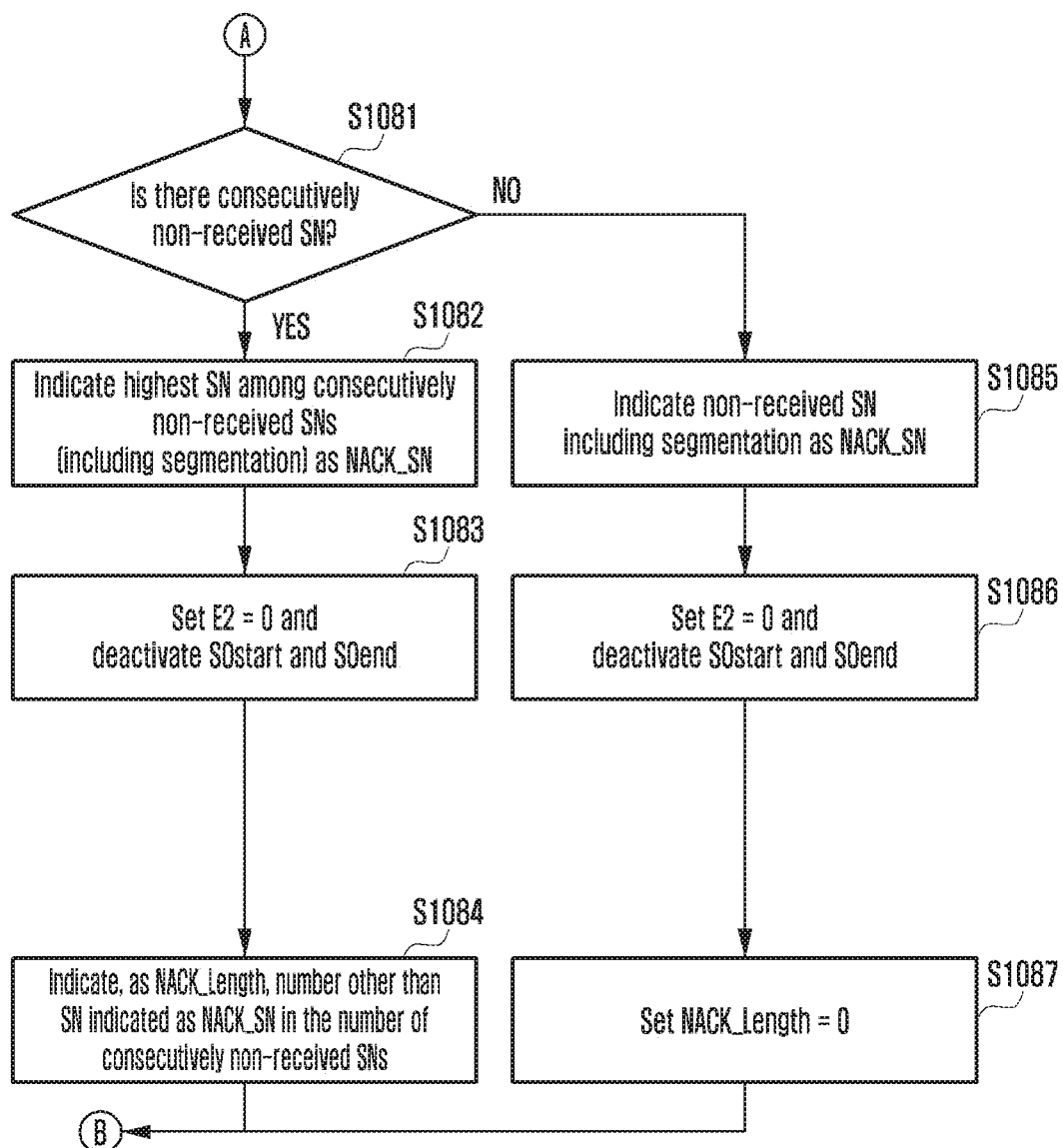

FIGS. 10CA and 10CB, are diagrams illustrating another method for generating, by a UE, a STATUS PDU according to an embodiment of the present disclosure.

Referring to FIGS. 10CA and 10CB, the UE may receive data.

In operation S1070, the UE may check whether or not there is the non-received data.

If there is the non-received data, in operation S1071, the UE may check whether or not there is segmented data among the non-received data.

If there is the segmented data, in operation S1072, the UE may check whether or not the non-received data is the consecutively non-received data.

If the non-received data is not the consecutively non-received data, in operation S1073, the UE may indicate the sequence number of the non-received data as the NACK_SN.

Further, since there is the segmented data, in operation S1074, the UE may set E2=1 and indicate the start point of the non-received data as the SOstart.

Further, in operation S1075, the UE may indicate the end time of the non-received data as the SOend.

In the present embodiment, the NACK_length field is activated at all times, and therefore the E3 field may not be used. Therefore, in operation S1076, the UE may set NACK_length=0.

On the other hand, if it is determined in the operation S1072 that the non-received data is the consecutively non-received data, in operation S1077, the UE may indicate the highest sequence number among the consecutive data as the NACK_SN.

Further, since there is the segmented data, in operation S1078, the UE may set E2=1 and indicate, as the SOstart, the start point of the non-received data in data having the lowest sequence number among the non-received data.

Further, in operation S1079, the UE may indicate, as the SOend, the end time of the non-received data in data having the highest sequence number among the non-received data.

Further, since the data is not consecutively received, in operation S1080, the UE sets E3=1 and may indicate, as the NACK_length, the number other than the sequence number indicated as the NACK_SN from the number of consecutively non-received data.

Meanwhile, if it is determined in operation S1071 that there is no segmented data among the non-received data, in operation S1081, the UE may identify whether or not the non-received data is the consecutively non-received data.

If the non-received data is the consecutively non-received data, in operation S1082, the UE may indicate the highest sequence number among the consecutive non-received data as the NACK_SN.

In addition, since there are no segmented packets, in operation S1083, the UE may set E2=0 and deactivate the SOstart and the SOend.

Further, since the data is not consecutively received, in operation S1084, the UE sets E3=1 and may indicate, as the NACK_length, the number other than the sequence number indicated as the NACK_SN from the number of consecutively non-received data.

If it is determined in the operation S1081 that the non-received data is not the consecutively non-received data, in operation S1085, the UE may indicate the sequence number of the non-received data as the NACK_SN.

In addition, since there are no segmented packets, in operation S1086, the UE may set E2=0 and deactivate the SOstart and the SOend.

Further, since the non-received data is not the consecutively non-received data, the UE may not use the NACK_length field. Therefore, in operation S1087, the UE may set NACK_length=0.

Further, in operation S1088, the UE may identify whether or not there is non-received data to be additionally notified.

When there is the non-received data to be additionally notified, in operation S1089, the UE may set E1=1 and repeat the process on the subsequent non-received data.

On the other hand, if there is no non-received data, in operation S1090, the UE may set E1=0 and generate the STATUS PDU.

In contrast, the related art may allocate the sequence number to the packet after all the RLC SDUs are combined (connected) by the concatenation function or segmented. That is, after the information of the RLC PDU is completely defined, the sequence number may be allocated. Therefore, the UE needs to be allocated the uplink resources from the base station upon the uplink transmission and process the RLC processing after the actual transmission time from the completion of the logical channel priority allocation, which may lead to the increase in the real time processing burden of the UE.

Therefore, a method for reducing a real-time throughput of UE is proposed below.

Figure 11:
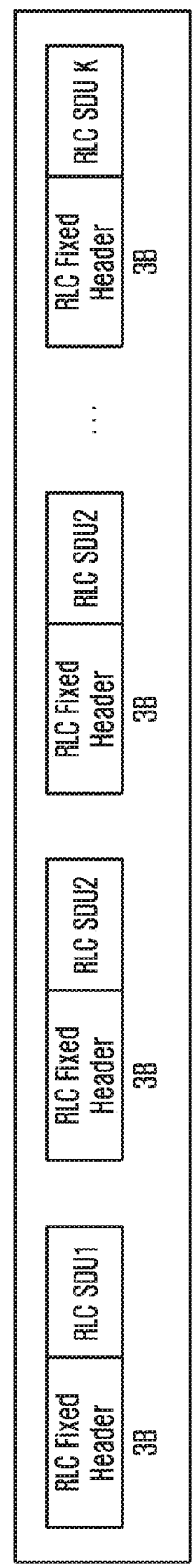
FIG. 11 is a diagram illustrating a method for combining a header having a fixed size with an RLC service data unit (SDU) according to another embodiment of the present disclosure.

FIG. 11 is a diagram illustrating a method for combining a header having a fixed size with an RLC SDU according to an embodiment of the present disclosure.

Referring to FIG. 11, the present disclosure proposes a method for generating an RLC PDU by combining RLC header having a fixed size with each RLC SDU without performing concatenation to improve a processing speed.

Comparing with FIG. 3, in the case of FIG. 3, the RLC layer may perform the real-time concatenation by determining a size of a transport block to perform the concatenation process after receiving the RLC SDU.

On the other hand, in the present disclosure, as illustrated in FIG. 11, the RLC layer does not generate one RLC PDU by combining a plurality of RLC SDUs, but the RLC layer may generate the RLC PDU by combining the fixed RLC SDU headers with the respective RLC SDUs. Further, the multiplexing in the MAC layer may replace the concatenation process.

As such, the concatenation process is omitted, and thus the real-time processing time of the UE may be reduced.

Figure 12:
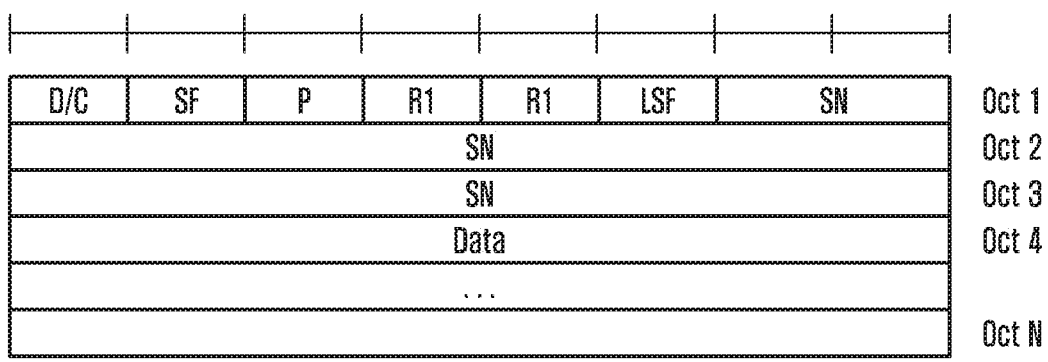
FIG. 12 is a diagram illustrating in detail a format of an RLC PDU according to an embodiment of the present disclosure.

FIG. 12 is a diagram illustrating in detail a format of the RLC PDU according to an embodiment of the present disclosure.

Referring to FIG. 12, the length of the fixed RLC header may be fixed to 3 bytes. The fixed RLC header includes the D/C field, a segmentation indicator field (SF field), a polling bit field (P field), a reserved field (R1 field), a last segment indicator field (LSF field), a sequence number field (SN field), and the like.

Comparing with the header combined with the RLC PDU of FIG. 4, the fixed RLC header does not include a framing information field (FI), and a resegmentation flag field (RF) is replaced with the SF field and thus when the segmentation is made regardless of all the first segmentation and the resegmentation, the value of the SF field may be set to 1.

The detailed contents of the respective fields are as follows.

The D/C field may indicate whether the PDU is the control PDU or the data PDU. For example, when the D/C field is represented by 1, the data PDU may be indicated and when the D/C field is represented by 0, the control PDU may be indicated.

The SF field may indicate whether or not the PDU is the segmented PDU or the non-segmented PDU. That is, the SF field may be referred to as information indicating whether or not the packet is segmented. For example, in the case of the segmented PDU, the SF field may be set to 1 and in the case of the PDU that is not segmented, the SF field may be set to 0.

The P field may indicate the polling for requesting the STATUS PDU.

In the case of the segmented PDU, the LSF field may indicate the last segment. For example, in the case of the last segment, the LSF field may be set to 1 and in the case of not the last segment, the LSF field may be set to 0.

Further, the SN field may indicate the sequence number of the packet. At this point, the above-mentioned example may be changed according to the embodiment.

Figure 13A:
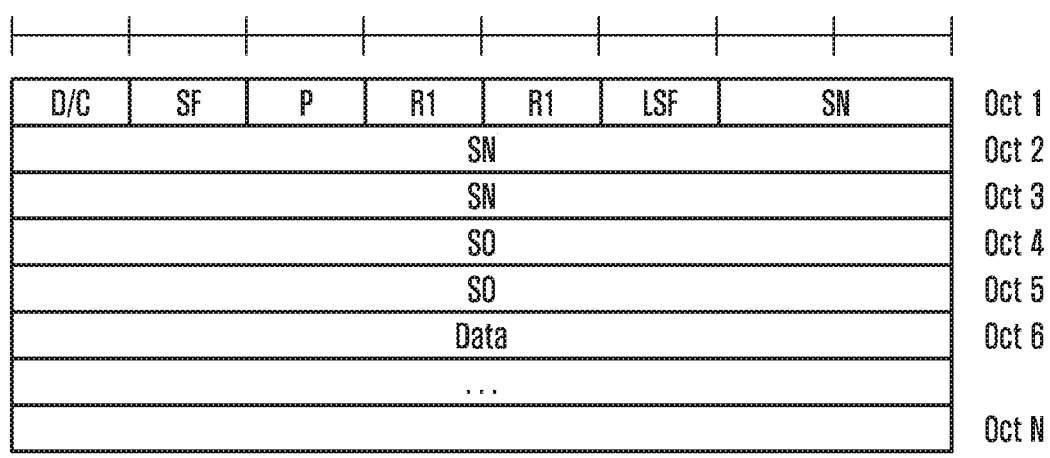
FIGS. 13A, 13B, and 13C are diagrams illustrating a PDU format when a PDU is segmented according to an embodiment of the present disclosure.

FIG. 13A is a diagram illustrating a PDU format when a PDU is segmented according to an embodiment of the present disclosure.

Referring to FIG. 13A, when the PUD is segmented, the SF may be indicated as being segmented. For example, the SF may be set to 1.

At this point, a segment offset (SO) field indicating the start point of the segmented data may be added to the RLC header. The SO field may be referred to as information indicating a segmentation location of the segmented data. For example, if the SDU is segmented and the RLC header includes data from a 100 byte point, then the SO field may be set to 100. If the segment offset is set to 0 even in the case of the segmented data, the SO field may be omitted and thus may have the PDU format illustrated in FIG. 12. The detailed method will be described below with reference to FIG. 14.

In addition, the detailed description thereof is the same as those described above and therefore will be omitted below.

Figure 13B:
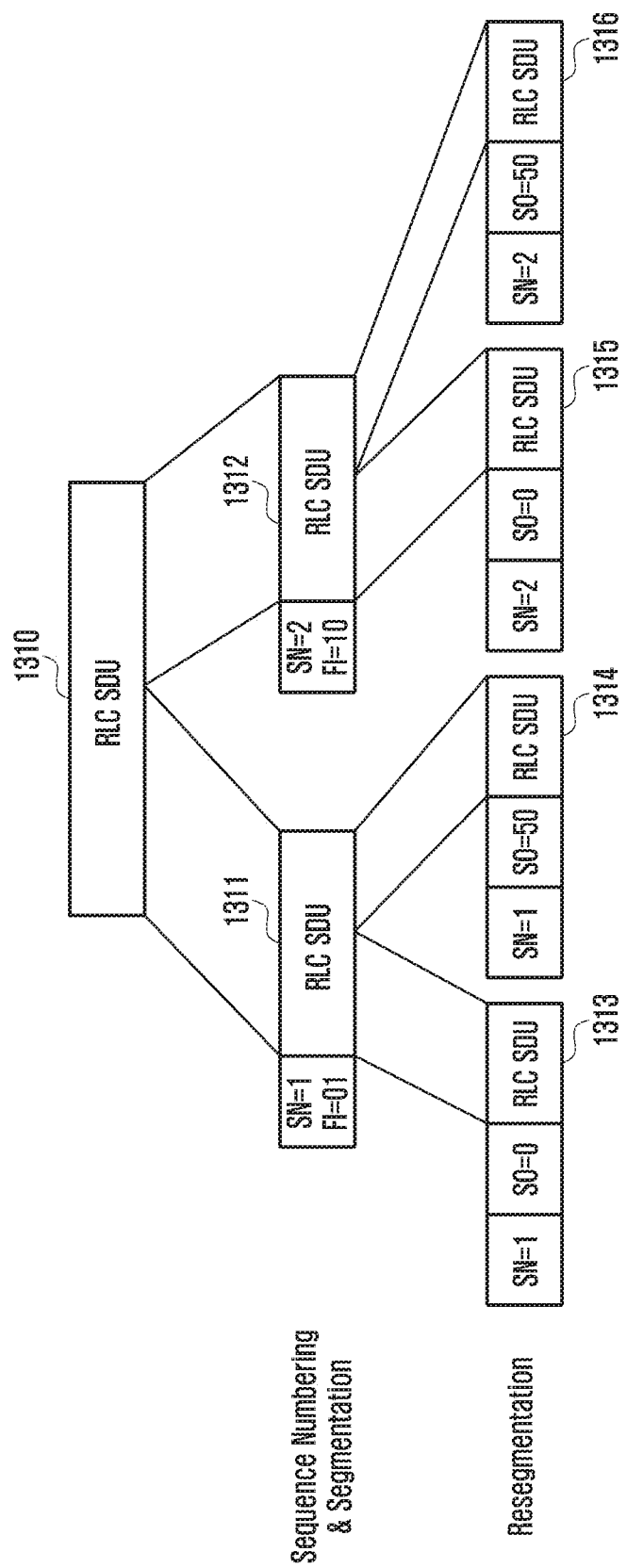

FIG. 13B is a diagram illustrating an example of a case where a packet is segmented in the LTE system according to an embodiment of the present disclosure.

Referring to FIG. 13B, in the LTE system, the transmitter may segment the RLC SDU and perform the sequence numbering.

Accordingly, an RLC SDU 1310 may be segmented into an RLC SDU 1311 and an RLC SDU 1312, and each RLC SDU may be combined with a header. At this point, a header set as SN=1 and FI=01 may be combined with the RLC SDU 1311 and a header set as SN=2 and FI=10 may be combined with the RLC SDU 1312.

At this point, the FI field is a field indicating whether or not the SDU is segmented. It may mean that if the FI field is set to 01, the head part of the SDU is segmented.

In addition, the transmitter may resegment the RLC SDU 1311 and the RLC SDU 1312. In the case of the resegmentation, the previous sequence number may be used as it is and the SO field indicating the start point of the segmented data may be further included.

Accordingly, a header set as SN=1 and SO=0 may be combined with the RLC SDU 1313 and a header set as SN=1 and SO=50 may be combined with the RLC SDU 1314. At this point, SO=50 may mean that the RLC SDU 1311 is segmented into 50 bytes.

Further, a header set as SN=2 and SO=0 may be combined with the RLC SDU 1315 and a header set as SN=2 and SO=50 may be combined with the RLC SDU 1316.

Figure 13C:
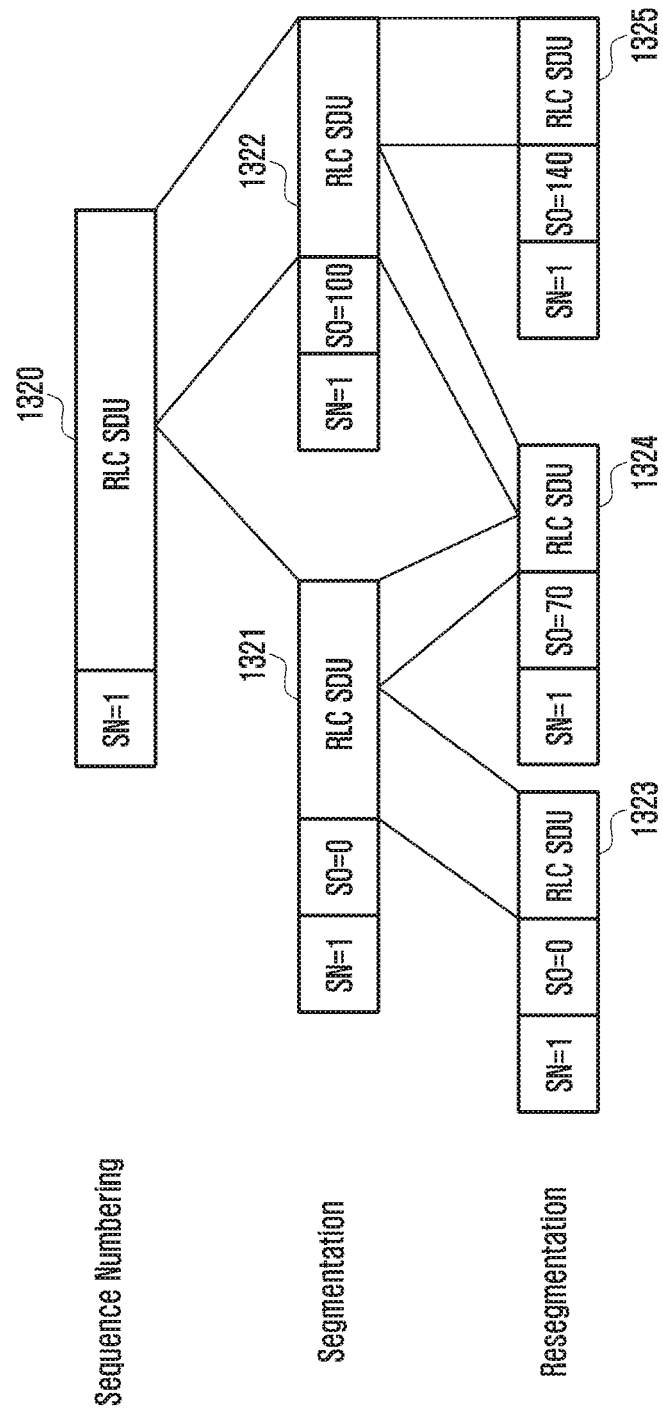

FIG. 13C is a diagram illustrating a packet segmentation method according to an embodiment of the present disclosure.

Referring to FIG. 13C, the transmitter may perform the sequence numbering and then perform the segmentation. Therefore, only the segmentation is performed in real time, the segmentation is also possible in the MAC layer, and the degree of freedom of segmentation of the same packet may be increased upon the resegmentation.

Accordingly, the transmitter may combine the header set as SN=1 with an RLC SDU 1320 and then segment an RLC SDU 1321.

Accordingly, the header set as SN=1 and SO=0 may be combined with an RLC SDU 1321 and a header set as SN=1 and SO=100 may be combined with an RLC SDU 1322. At this point, SO=50 may mean that the RLC SDU 1320 is segmented into 50 bytes.

Further, the transmitter may resegment the RLC SDU 1320. Accordingly, the header set as SN=1 and SO=0 may be combined with an RLC SDU 1323 and the header set as SN=1 and SO=70 may be combined with an RLC SDU 1324. In addition, the RLC SDU 1324 may be generated by combining parts that are segmented from the RLC SDU 1321 and the RLC SDU 1322 (including an RLC SDU 1325), respectively.

In the embodiment of FIG. 13C, the SO field may be omitted when SO=0.

Figure 14:
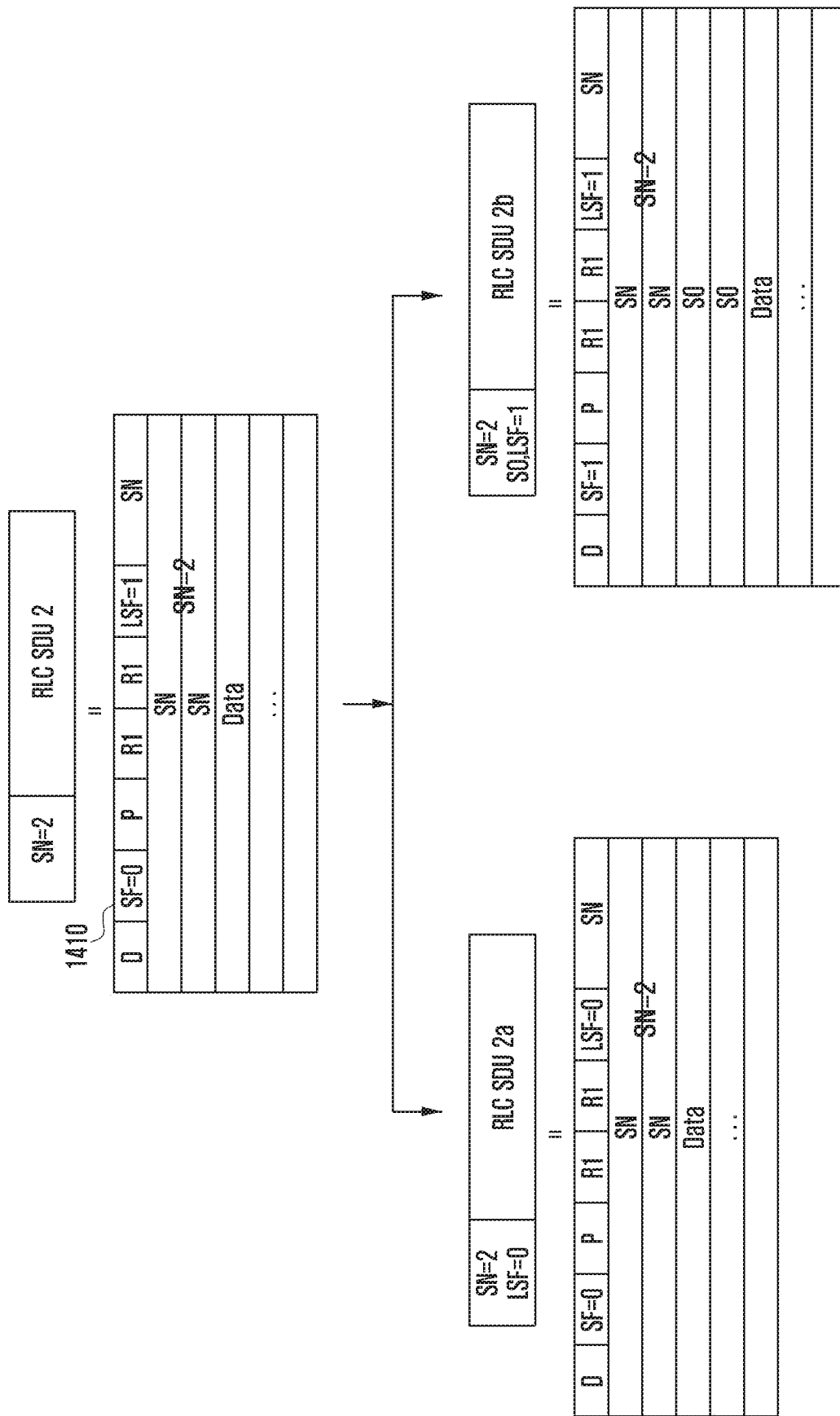
FIG. 14 is a view illustrating one example of a segmentation method according to an embodiment of the present disclosure.

FIG. 14 is a view illustrating one example of a segmentation method according to an embodiment of the present disclosure.

Referring to FIG. 14, it is assumed that the RLC SDU is allocated SN=2. In this embodiment, an SF 1410 may be set to 0 since the segmentation is not performed at first.

Next, when a physical resource (i.e., resource block) is allocated and thus the segmentation is required, a data part may be segmented in a segmentation function and a header part including the segmented data may be changed.

Although various embodiments may exist, in the present embodiment, the head part (SDU 2a) of the segmented data may set SF to 0.

Even when the SF is set to 0, the LSF field is set to 0, and thus it may indicate that SF=0 and LSF=0 is the head part of the data although the segmentation is generated. When the method is used, the SO field may be omitted in the header corresponding to the front part of the segmented data.

The SF field is set to 1 and segmented, such that it should be specified that the SO field is accompanied in the rear part (SDU 2b) of the data, and it may be informed from which part of the data is included in the SO field.

Further, in the embodiment of FIG. 14, when the LSF is set to 1, it is possible to inform that the segmented part is the last data.

The combination of the SF and LSF fields may be summarized as follows.
  SF=0, LSF=1: SDU not segmented (No SO field)
  SF=0, LSF=0: First part of segmented SDU (SO field may be omitted)
  SF=1, LSF=0: Not first part and last part of segmented SDU (SO field is required)
  SF=1, LSF=1: Last part of segmented SDU (SO field is required)

In the present embodiment, it is indicated that the segment information may be specified by 2-bits of the SF and the LSF, and values of 0 and 1 may be changed according to the embodiment. Further, the locations of the SF and the LSF may be changed in the header.

In the embodiment of FIG. 14, although the method for omitting an SO field according to a combination of SF and LSF is illustrated, the SO field may not be omitted according to the embodiment. In this case, the combination of the SF field and the LSF field may be shown as follows.
  SF=0: SDU not segmented (LSF is disregarded)
  SF=1, LSF=0: Not last part of segmented SDU (SO field is required)
  SF=1, LSF=1: Last part of segmented SDU (SO field is required)

Figure 15:
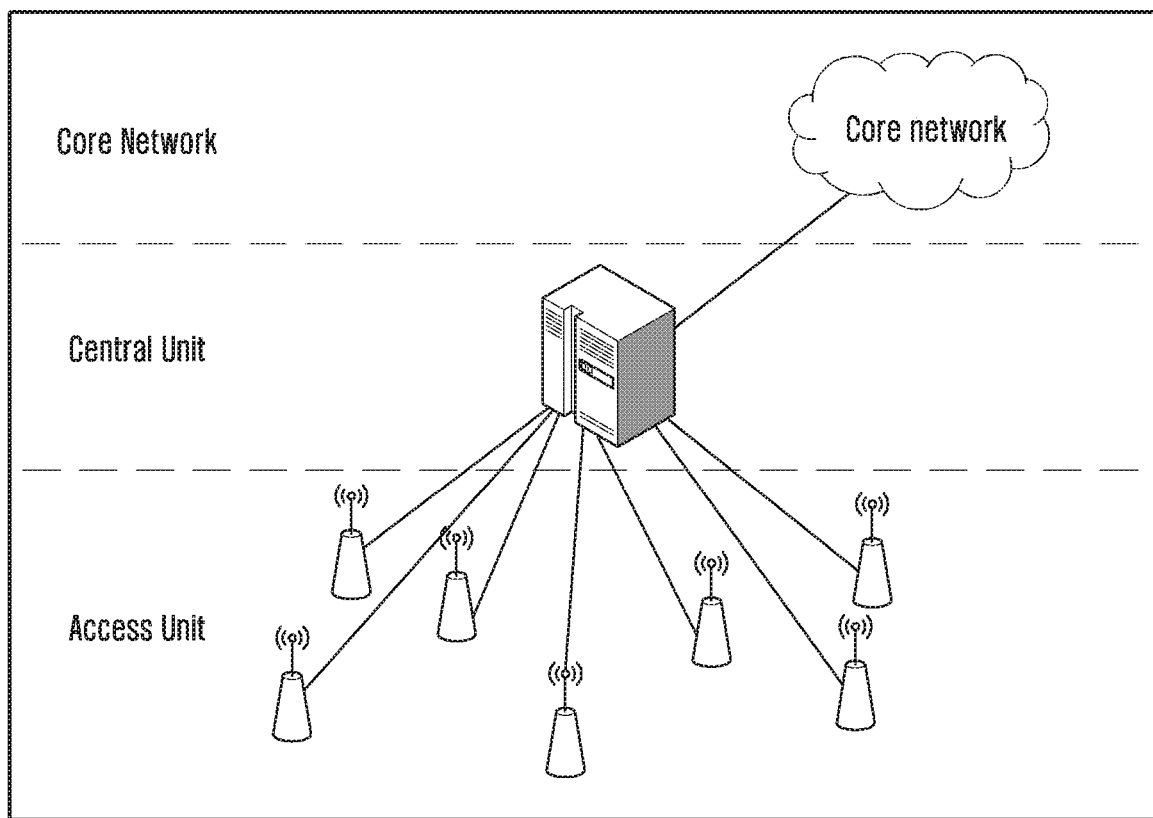
FIG. 15 is a conceptual diagram of a case where a function of a base station is implemented by being separated into central unit (CU) and access unit (AU) according to an embodiment of the present disclosure.

FIG. 15 is a conceptual diagram of a case where a function of a base station is implemented by being separated into a central unit (CU) and an access unit (AU) according to an embodiment of the present disclosure.

Referring to FIG. 15, typically, a CU may be implemented by including a higher layer protocol of the protocol stack of the base station and an AU may be implemented by including a relatively lower layer protocol.

Describing, by way of example, the protocol stack of the LTE according to the embodiment, the RRC and the PDCP may be implemented in the CU and the RLC, the MAC, and the PHY may be implemented in the AU. This may vary according to a CU-AU function distribution method.

According to the embodiment, processing and segmenting the part to which an initial header of FIG. 14 is attached in the CU may be performed in the AU. In this case, the CU attaches the SN, processes it with SF=0 and LSF=1, transmits the data to the AU, and changes the SF/LSF in the AU according to scheduling information (allocation of the resource block), and inserts the SO, thereby performing the segmentation.

Figure 16A:
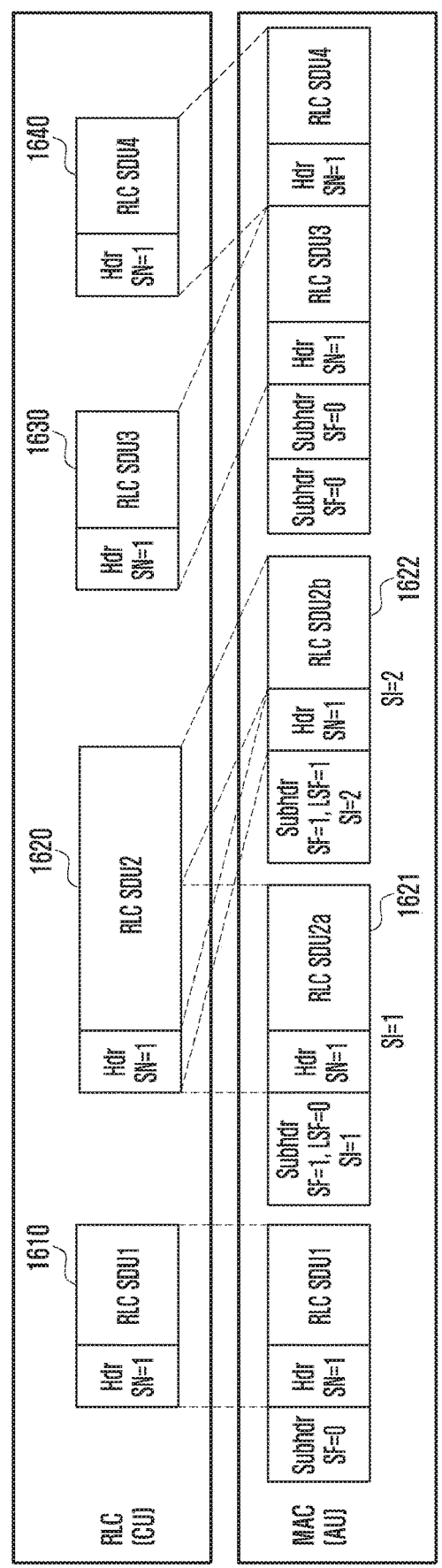
FIGS. 16A and 16B are diagrams illustrating a method for performing a segmentation in a medium access control (MAC) layer according to an embodiment of the present disclosure.
Figure 16B:
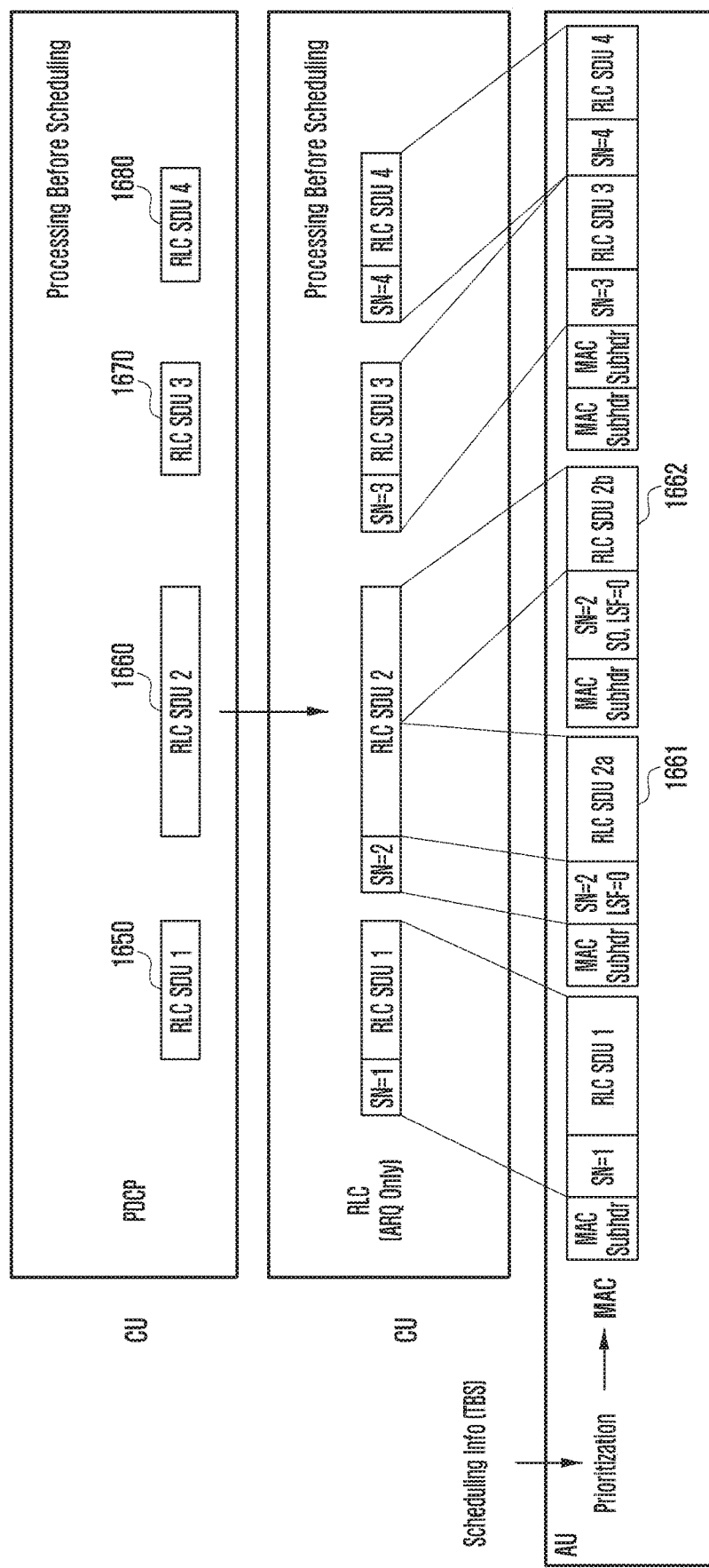

FIGS. 16A and 16B are diagrams illustrating a method for performing segmentation in a MAC layer according to an embodiment of the present disclosure.

Referring to FIGS. 16A and 16B, in the case of the existing LTE and the above-mentioned embodiment, the RLC layer may use the RLC SN to perform the segmentation. However, according to the embodiment, the MAC layer may use the RLC SN to perform the segmentation. By doing so, only the MAC layer may perform the real time processing after the scheduling (resource block allocation, TBS determination). To implement this, the segment information may be included in the MAC header. Further, the RLC SN is used for the segmentation, it is necessary to read the RLC SN in the processing of the MAC header.

Referring to FIG. 16A, even when the MAC layer segments data, the MAC layer may use the combined RAC header in the RLC layer as it is and include the segment information in a MAC subheader. In addition, the case where the RLC layer is implemented in the CU and the MAC layer is implemented in the AU will be described as an example.

The same SN=1 may be allocated to the RLC SDU 1 1610, RLC SDU 2 1620, RLC SDU 3 1630, and RLC SDU 4 1640 of FIG. 16A.

The MAC layer may generate the MAC PDU by combining the MAC subheaders without segmenting the RLC SDU 1 1610.

The MAC layer may segment the RLC SDU 2 1620 into an RLC SDU 2a 1621 and an RLC SDU 2b 1622. At this point, the MAC layer may use the combined RLC header in the RLC layer as it is, and the MAC subheader of the RLC SDU 2a 1621 may be set to 1 in the SF field and 0 in the LSF field. That is, the fact that the packet is segmented and is not the last packet may be indicated through the field. In the embodiment of FIG. 16A, the order of the packets segmented into SI field may be indicated and restored.

In addition, the MAC layer may set the SF field to 1 and the LSF field to 1 in the MAC subheader of the RLC SDU 2*b* 1622. The packet is segmented by the method, and it may be indicated that the packet is the last packet through the field.

In addition, the MAC layer may concatenate the RLC SDU 3 1630 and the RLC SDU 4 1640. In this case, the MAC layer may combine each of the subheaders for each packet and set the SF field to 0 to indicate that the packet is not segmented. The subheader is illustrated as being gathered in the front, but in the present disclosure, the location of the subheader is not limited.

Referring to FIG. 16B, the PDCP layer and the RLC layer may be located in the CU, and the MAC layer may be located in the AU.

The PDCP layer may transmit RLC SDU 1 1650, RLC SDU 2 1660, RLC SDU 3 1670, and RLC SDU 4 1680 to the RLC layer.

The RLC layer may allocate sequence numbers to each of the received RLC SDUs. The RLC layer according to an embodiment of the present disclosure may allocate a sequence number 1 (SN=1) to the RLC SDU 1, SN=2 to the RLC SDU 2, SN=3 to the RLC SDU 3, and SN=4 to the RLC SDU 4. However, the embodiment of the present disclosure is not limited thereto.

Further, the RLC layer may transmit the packet with which the sequence number is combined to the MAC layer. The AU may perform the segmentation using the sequence number (hereinafter, RLC SN) allocated to the packet in the RLC layer. The MAC layer located in the AU may receive the scheduling information and may segment the received packet considering the size of the transport block included in the scheduling information, the resource block, and the like. As such, the PDCP layer and the RLC layer allocate the sequence number to a packet before the scheduling and process (transmit) it, whereas only the layers and the functions located in the AU may perform the real time processing after the scheduling.

In detail, the AU may generate the MAC PDU by combining the MAC subheaders without segmenting the RLC SDU 1 1650.

Meanwhile, the MAC layer may segment the RLC SDU 2 1660 into an RLC SDU 2*a* 1661 and an RLC SDU 2*b* 1662. At this point, the AU may use the sequence number allocated in the RLC layer as it is, and may indicate whether or not the packet is the last packet through the LSF field. The process may be formed by modifying the RLC header in the MAC layer or in the form in which the segmentation function of the RLC is implemented in the AU.

Specifically, the AU may combine the MAC subheader with the RLC SDU 2*a* 1661, and the LSF field of the RLC subheader may be set to 0. That is, the RLC layer may indicate the fact that the packet is segmented and is not the last packet through the field.

In addition, the MAC layer may combine the MAC subheader with the RLC SDU 2*b* 1662. At this point, the AU may set the LSF field of the RLC header to 1 and set the SO field to set the segmentation start point of the packet. That is, the AU may indicate the fact that the packet is segmented and is the last packet and the location where the packet is segmented through the field.

Further, the MAC layer may concatenate the RLC SDU 3 1670 with the RLC SDU 4 1680. In this case, the MAC layer may combine the subheaders for each packet. The detailed content of the subheader to be combined with the packet in the MAC layer will be described below.

Figure 17:
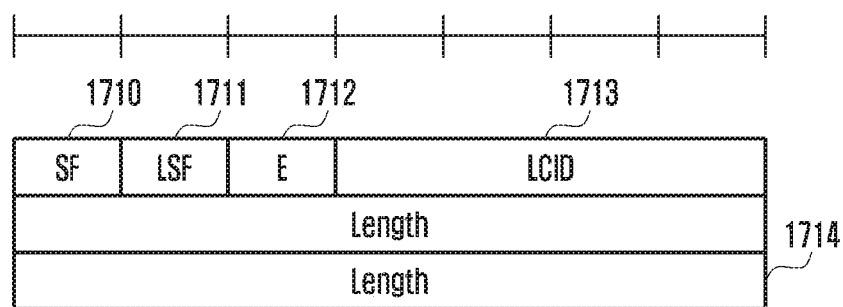
FIG. 17 is a diagram illustrating a format of a MAC subheader according to an embodiment of the present disclosure.

FIG. 17 is a diagram illustrating a format of a MAC subheader according to an embodiment of the present disclosure. FIG. 17 illustrates an embodiment corresponding to performing a segmenting function in the MAC layer as in the embodiment of FIG. 16A.

FIG. 17 illustrates a MAC subheader format when the segmentation is performed in the MAC layer. At this point, it is assumed that the MAC layer uses the RLC SN for the segmentation. FIG. 17 illustrates the format of the MAC header when there is no SO field, unlike in FIG. 18.

Referring to FIG. 17, as described above, an SF field 1710 may indicate whether or not the packet (SDU) has been segmented, and an LSF field 1711 indicates whether or not the packet to which the corresponding subheader is combined is the last part segmented.

A MAC subheader presence/absence indicator field 1712 may indicate whether or not there is the subsequent MAC subheader.

A logical channel identifier (LCID) field 1713 may indicate an identifier of a logical channel. Further, a length field 1714 may indicate the size of the MAC SDU.

Figure 18:
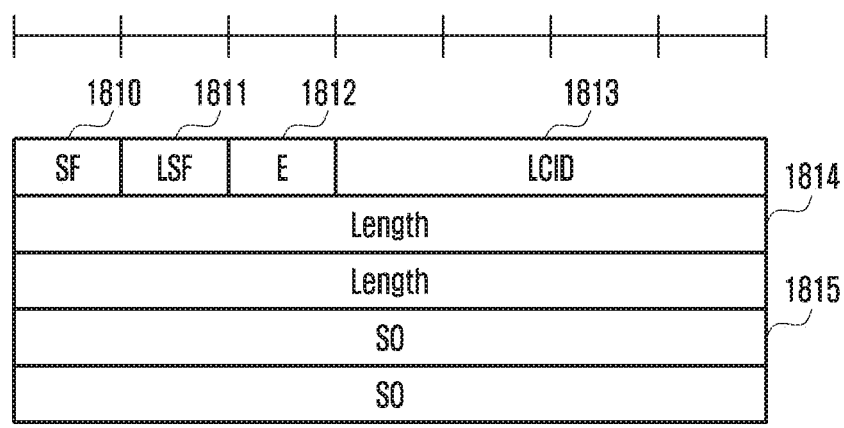
FIG. 18 is a diagram illustrating another format of a MAC subheader according to an embodiment of the present disclosure.

FIG. 18 is a diagram illustrating another format of a MAC subheader according to an embodiment of the present disclosure. FIG. 18 illustrates an embodiment corresponding to performing a segmenting function in the MAC layer as in the embodiment of FIG. 16A.

FIG. 18 illustrates the MAC subheader format when the segmentation is performed in the MAC layer. At this point, it is assumed that the MAC layer uses the RLC SN for the segmentation. FIG. 18 illustrates the format of the MAC header when there is the SO field.

Referring to FIG. 18, the contents of an SF field 1810, an LSF field 1811, an E field 1812, an LCID field 1813, and a length field 1814 are the same as those described above.

An SO field 1815 may indicate a location where the packet is segmented, as described above. For example, if the packet is segmented from 105 bytes, the SO field 1815 may be set to indicate 105 bytes.

Figure 19:
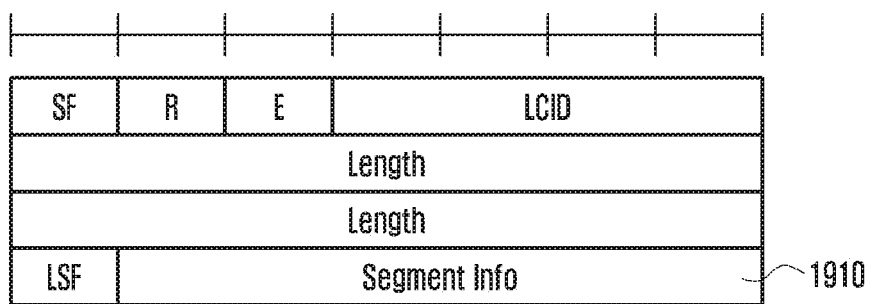
FIG. 19 is a diagram illustrating another format of a MAC subheader according to an embodiment of the present disclosure.

FIG. 19 is a diagram illustrating another format of the MAC subheader according to an embodiment of the present disclosure. FIG. 19 illustrates an embodiment corresponding to performing a segmenting function in the MAC layer as in the embodiment of FIG. 16A.

Referring to FIG. 19, the MAC subheader may include the SF field, the R field, the E field, the LCID field, the length field, and the LSF field. In addition, the MAC subheader may include a segment information field.

A segment information field 1910 may indicate how many times the data packet is segmented when the data packet is segmented. For example, if 7 is indicated in the segment information field 1910, this may indicate that the data packet is a seventh segmented packet (segment). Further, the LSF field may indicate whether or not the segmented packet (segment) is the last packet (segment).

In addition, the LSF field and the segment information field may be activated as the SF field.

Figure 20:
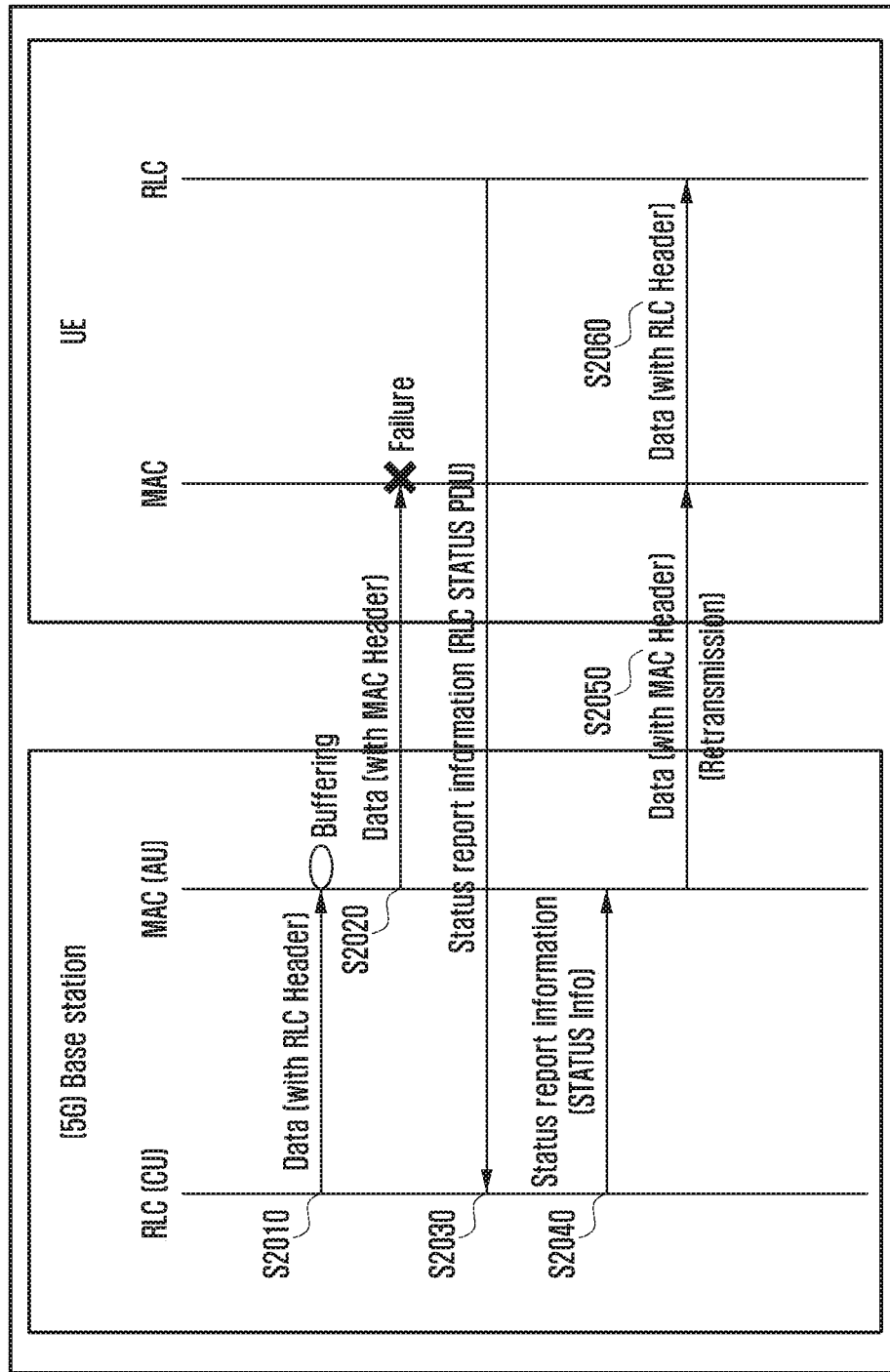
FIG. 20 is a diagram illustrating a packet retransmission process according to an embodiment of the present disclosure.

FIG. 20 is a diagram illustrating a packet retransmission process according to an embodiment of the present disclosure.

FIG. 20 illustrates a packet retransmission process when an RLC layer responsible for retransmission (ARQ) is located in a CU in a downlink and a segmentation function is located in the AU.

At this point, the segmentation function may be included in at least one of the RLC layer and the MAC layer.

The retransmission operation of the UE that is the receiving end may be performed in the RLC layer and when the data is not normally received, the UE may transmit the RLC STATUS PDU to the base station that is the transmitting end.

Specifically, the RLC layer of the base station may transmit data, in operation S2010. The base station may combine the RLC header with the data and transmit it to the MAC layer located in the AU.

The MAC layer of the base station may transmit the data received in the operation S2020 to the UE. The MAC layer of the base station may combine the MAC header with the received data and transmit it to the UE. At this point, when there is a lot of received data, the MAC layer may store some of the received data in the buffer.

If the UE does not successfully receive the data, the RLC layer of the UE may transmit the status report information (RLC STATUS PDU) to the base station, in operation S2030.

At this point, since the RLC layer performing the ARQ function is located in the CU, the base station may receive the STATUS PDU in the CU, and the RLC layer may transmit all or a part of the information to the layer performing the segmentation function of the AU.

That is, the RLC layer may transmit the status report information to the MAC layer of the AU, in operation S2040. In the present disclosure, a layer performing the segmentation function is described as the MAC layer as an example but may be an RLC layer as described above. In this case, the RLC layer may exist in the CU and the AU, respectively.

Accordingly, the MAC layer located in the AU may perform the retransmission by performing the segmentation, in operation S2050. The MAC layer may perform the retransmission by combining the MAC header with data.

Therefore, the MAC layer of the UE may receive the data and in operation S2060, transmit it to the RLC layer. At this point, the RLC header may be combined with the data.

The STATUS PDU may be the STATUS PDU of the embodiments of FIGS. 7A, 7B, 8, and 9. Further, after the CU receives the RLC STATUS PDU according to the embodiment, the CU may perform the segmentation for the retransmission and transmit it to the AU. In order to be operated as described above, the segmentation function for the retransmission may be implemented in the CU.

FIG. 21 is a diagram illustrating a structure of a packet with which a MAC subheader according to an embodiment of the present disclosure.

FIG. 21, a method for omitting an LCID field in a MAC subheader structure will be described.

As described with reference to FIG. 11, if the concatenation of the RLC layer is not performed, the RLC SN and the MAC subheader may be combined with each RLC SDU. This may lead to an increase in header overhead, and a method for omitting redundant information in order to reduce header overhead is proposed.

Referring to FIG. 21, a 3-byte subheader informing the LCID may be combined in the MAC layer, and then the LCID may be omitted in a subheader and a 2-byte subheader may be combined.

For example, a 3-byte subheader 2110 including LCID=3 may be combined in the MAC layer, and then the redundant LCID may be omitted and 2-byte subheaders 2120 and 2130 may be combined.

At this point, each subheader may correspond to each packet (MAC SDUs) combined after the MAC subheader. In the present embodiment, information on a MAC SDU 2160 may be included in the MAC subheader 2110, and information on a MAC SDU 2170 may be included in the MAC subheader 2120.

Specifically, if the MAC SDUs are generated from the same logical channel, all the LCIDs are all the same, such that the repeated LCIDs may be omitted.

At this point, a logical channel change indication field (hereinafter, C field) may indicate whether or not the LCID of the subsequent MAC SDU is the same or omitted. For example, if the C field is set to 1, it may be indicated that the LCID field of the subsequent MAC subheader is equal to the value of the current MAC subheader and is omitted. However, this is only an example, and when the C field is set to 0 or set by other methods, it may be indicated that the LCID field of the subsequent MAC subheader is the same as the value of the current MAC subheader.

In another embodiment, the C field may inform whether or not the LCID field of the current MAC subheader is omitted. If the C field indicates that the LCID field is omitted, it may mean that it is the same as the LCID of the preceding MAC subheader.

For example, when the LCID in which the MAC SDU 2190 is generated is 4, the C field of the MAC subheader 2130 is set to 1 and thus may indicate that the logical channel for the subsequent packet is changed and the subsequent MAC subheader 2140 may consist of 3 bytes including LCID=4.

If there is no additional MAC subheader, the value of the C field may be disregarded.

Further, the embodiment of FIG. 21 does not limit the location of the MAC subheader. In the embodiment of FIG. 21, all the subheaders are described as being located before the MAC PDU according to the location of the MAC subheader of the LTE, but the LCID may be omitted by the C field even if it is located immediately before each MAC SDU.

As such, the redundant LCID is not included in the MAC subheader, such that the header overhead may be reduced.

FIG. 22 is a diagram illustrating a format of a MAC subheader according to an embodiment of the present disclosure.

FIG. 22 illustrates the format of a 3-byte MAC subheader including an LCID.

Referring to FIG. 22, the MAC subheader may include a reserved field (hereinafter, R field), an extension field (hereinafter, E field), an LCID field, and a length field value.

As described above, the C field may indicate whether or not the LCID of the subsequent MAC subheader is the same as the LCID of the current MAC subheader or whether or not the LCID of the subsequent MAC subheader is omitted.

Also, the E field may indicate whether or not it is the last SDU. For example, if the E field is set to 1, it may be set to indicate the last SDU. Describing an example with reference to FIG. 21, the E field is set to 1 in the MAC subheader 2150, and thus may indicate that the MAC SDU 2195 is the last packet.

FIG. 23 is a diagram illustrating another format of a MAC subheader according to an embodiment of the present disclosure.

FIG. 23 illustrates a 2-byte MAC subheader format that does not include an LCID.

Referring to FIG. 23, if the LCID included in the previous MAC subheader is not changed, the LCID included in the MAC subheader may be omitted. In addition, the detailed description of other fields is the same as those described above and therefore will be omitted below.

Meanwhile, although FIG. 21 illustrates, by way of example, the structure in which the MAC subheader is concentrated before the MAC PDU, the MAC subheader may be located immediately before the corresponding MAC SDU according to the embodiment.

The detailed content thereof will be described with reference to FIGS. 24A and 24B.

Figure 24A:
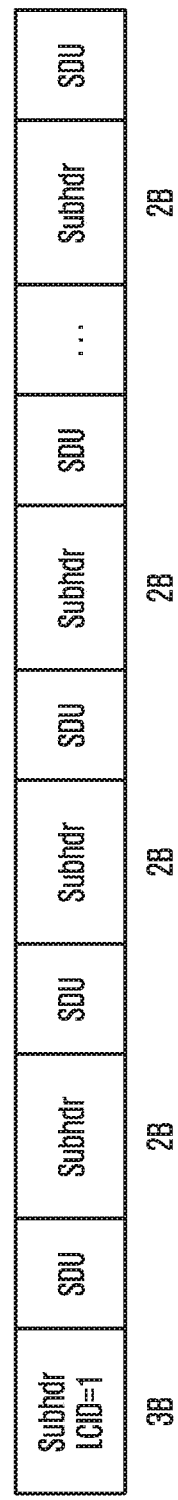
FIG. 24A is a diagram illustrating another structure of a packet with which a MAC subheader according to an embodiment of the present disclosure is combined.

FIG. 24A is a diagram illustrating another structure of a packet with which a MAC subheader according to an embodiment of the present disclosure is combined.

Referring to FIG. 24A, the MAC subheader may be located before each MAC SDU. Even in this case, if the LCID in which the MAC SDU is generated is the same as the LCID included in the previous MAC subheader, the LCID included in the MAC subheader may be omitted. Specifically, the method for configuring the MAC subheader is the same as described above and therefore may be omitted below.

Unlike the above description, a method for using a header having a fixed size may be considered, and therefore the detailed content thereof will be described with reference to FIG. 25.

FIG. 24B is a diagram illustrating a packet having a MAC subheader having a fixed size according to an embodiment of the present disclosure.

Referring to FIG. 24B, the MAC subheader may be set to have a fixed size of 3 bytes. Therefore, each MAC subheader may include the LCID.

Further, although the present embodiment describes, by way of example, that the MAC subheader is located before each MAC SDU, the present disclosure is not limited thereto and may have the structure in which the MAC subheader is concentrated before the MAC PDU as illustrated in FIG. 21.

FIG. 24C is a diagram illustrating the format of the MAC subheader according to an embodiment of the present disclosure.

Referring to FIG. 24C, the MAC subheader may consist of the reserved field, the extension field, the LCID field, and the length field. The detailed content of each field is the same as those described above and therefore will be omitted below.

The header format and the lengths of each field of FIGS. 21 to 23 and 24A to 24C may vary according to the embodiment.

As such, by fixing the size of the header, the processing power may be reduced and the real time processing may not be performed.

As described above, the sequence number may be allocated in the PDCP layer and the RLC layer, respectively, and the PDCP SN may be used for security, header compression, handover, and the like and the RLC SN may be used for retransmission, reordering, and the like.

However, when the concatenation process is omitted and the packet segmentation method is changed, the functions of the PDCP SN and the RLC SN may be redundant and a method using one header may be used.

Figure 25:
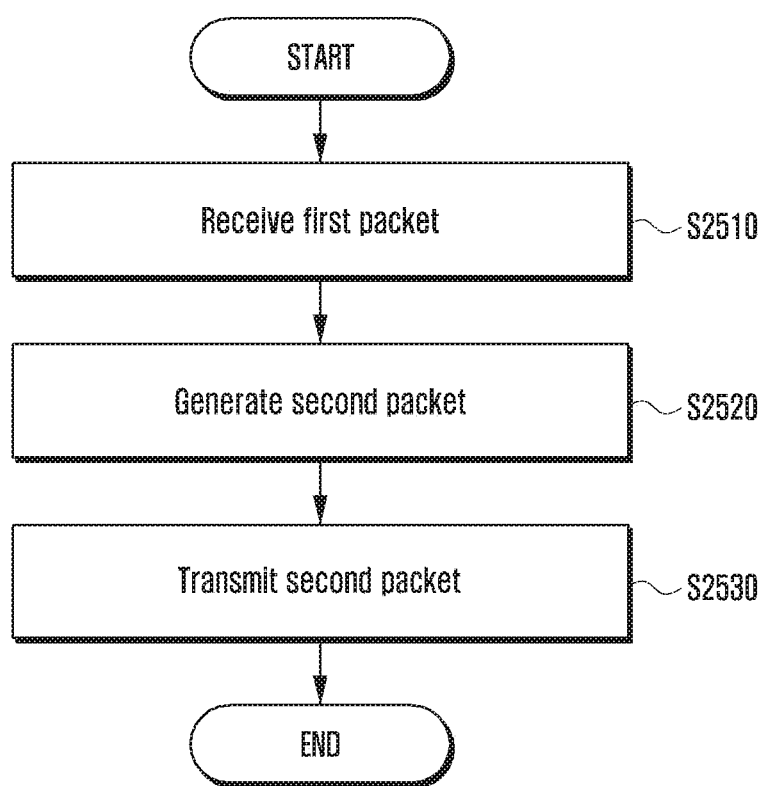
FIG. 25 is a flow chart illustrating a packet segmentation method according to an embodiment of the present disclosure.

FIG. 25 is a flow chart illustrating a packet segmentation method according to an embodiment of the present disclosure.

Referring to FIG. 25, the receiver may receive the first packet, in operation S2510. At this point, the first layer of the receiver may receive the first packet from the second layer which is the higher layer. Further, the receiver may receive the scheduling information from the transmitter, and may confirm the size of the transport block, and the like through the scheduling information.

Accordingly, the receiver may use the scheduling information to segment the first packet if necessary.

In operation S2520, the receiver may generate a second packet using the header including first information indicating whether or not the first packet is segmented and second information indicating whether or not the segmented packet is the last packet.

At this point, the first packet may be segmented in the RLC layer or the MAC layer of the receiver, and when the first packet is segmented in the RLC layer, the first information may mean the SF field of the RLC header and the second information may mean the LSF field. In addition, the first information may consist of one bit, and when the first information is set to 1, it may be indicated that the first packet is segmented. However, the scope of the present disclosure is not limited thereto, and when the first information is set to 0, the method for indicating that the first packet is segmented is also possible.

Further, when the first packet is segmented in the MAC layer of the receiver, the first information may mean the SF field or the C field of the MAC subheader and the second information may mean the E field or the LSF field. In addition, the second information may consist of 1 bit, and when the first information is set to 2, it may be indicated that the segmented packet is the last packet. However, the scope of the present disclosure is not limited thereto, and when the second information is set to 0, the method for indicating that the segmented packet is the last packet is also possible.

Further, when the first packet is segmented, the header may include information indicating the location of the segmented packet. For example, the information may mean the SO field.

Further, the receiver may transmit the second packet, in operation S2530. At this point, the first layer of the receiver may transmit the second packet from a third layer which is the lower layer.

Figure 26A:
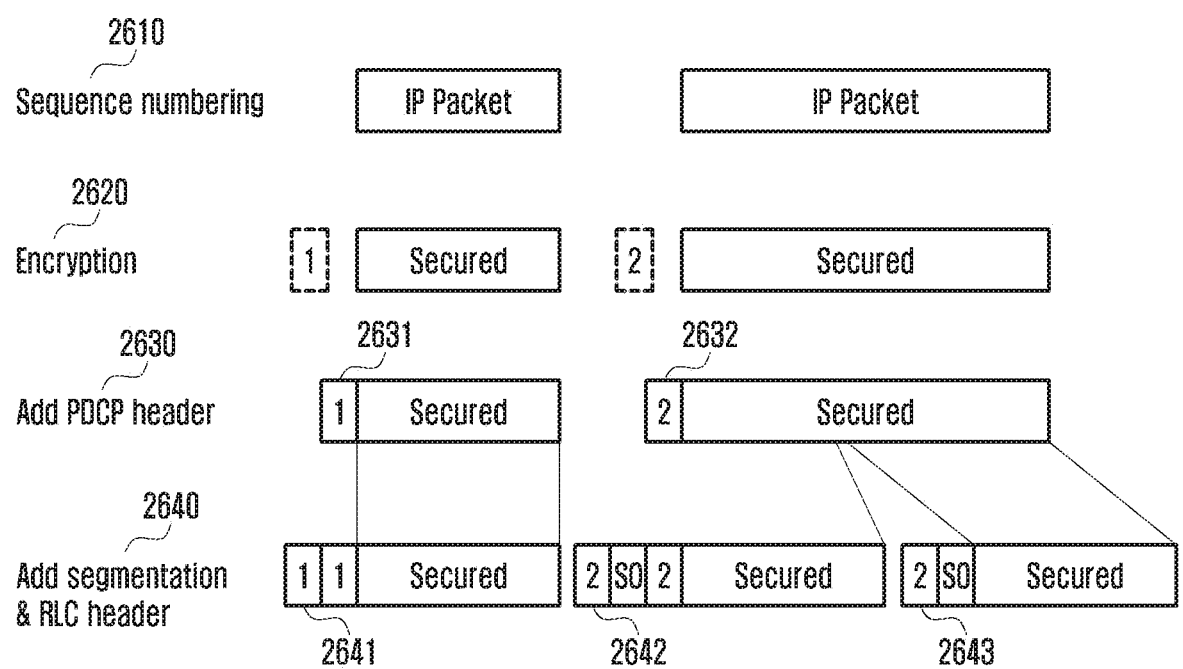
FIG. 26A is a diagram illustrating a method for allocating a sequence number in long term evolution (LTE) according to an embodiment of the present disclosure.

FIG. 26A is a diagram illustrating a method for allocating a sequence number in LTE according to an embodiment of the present disclosure.

Referring to FIG. 26A, the receiver may perform sequence numbering 2610 and encryption 2630 on the received packet.

In addition, the PDCP layer of the receiver may combine a PDCP header 2630 with the packet and allocate PDCP SNs 2631 and 2632 to each packet.

In addition, the RLC layer may combine an RLC header 2640 with the packet and allocate RLC SNs 2641, 2642, and 2643 to each packet.

As such, when the concatenation process is omitted, the PDCP SN and the RLC SN may be allocated identically and the functions thereof may be duplicated, and therefore a method for using one header will be described below.

Figure 26B:
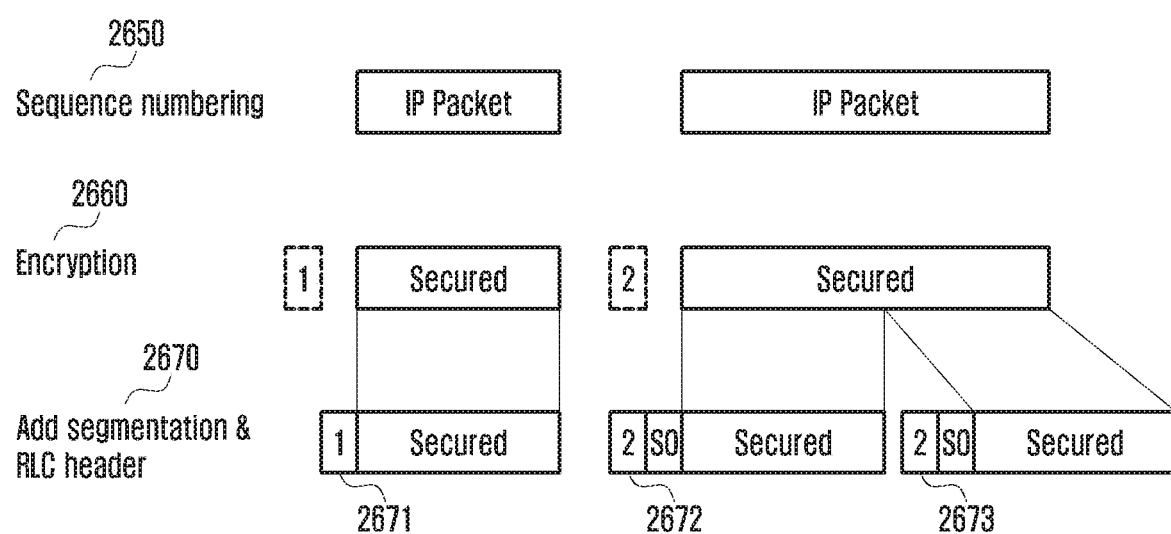
FIG. 26B is a diagram illustrating a method for using a packet data convergence protocol sequence number (PDCP SN) and an RLC SN as one by integrating the PDCP SN and the RLC SN according to an embodiment of the present disclosure.

FIG. 26B is a diagram illustrating a method for using a PDCP SN and an RLC SN as one by integrating the PDCP SN and the RLC SN according to an embodiment of the present disclosure.

Referring to FIG. 26B, the receiver may perform sequence numbering 2650 and encryption 2660 on the received packet.

In addition, the RLC layer of the receiver may segment the packet according to the scheduling information, and may perform a combination 2670 of the RLC header with the packet. Further, the RLC layer may allocate RLC SNs 2671, 2672, and 2673. At this point, for convenience of explanation, the present disclosure describes a layer in which the PDCP layer and the RLC layer are integrated, but the embodiment of the present disclosure is not limited thereto. That is, the layer in which the PDCP layer and the RLC layer are integrated may be referred to as a PDCP layer or a layer having another name.

As described above, by using only one SN, the header overhead may be reduced.

Figure 27:
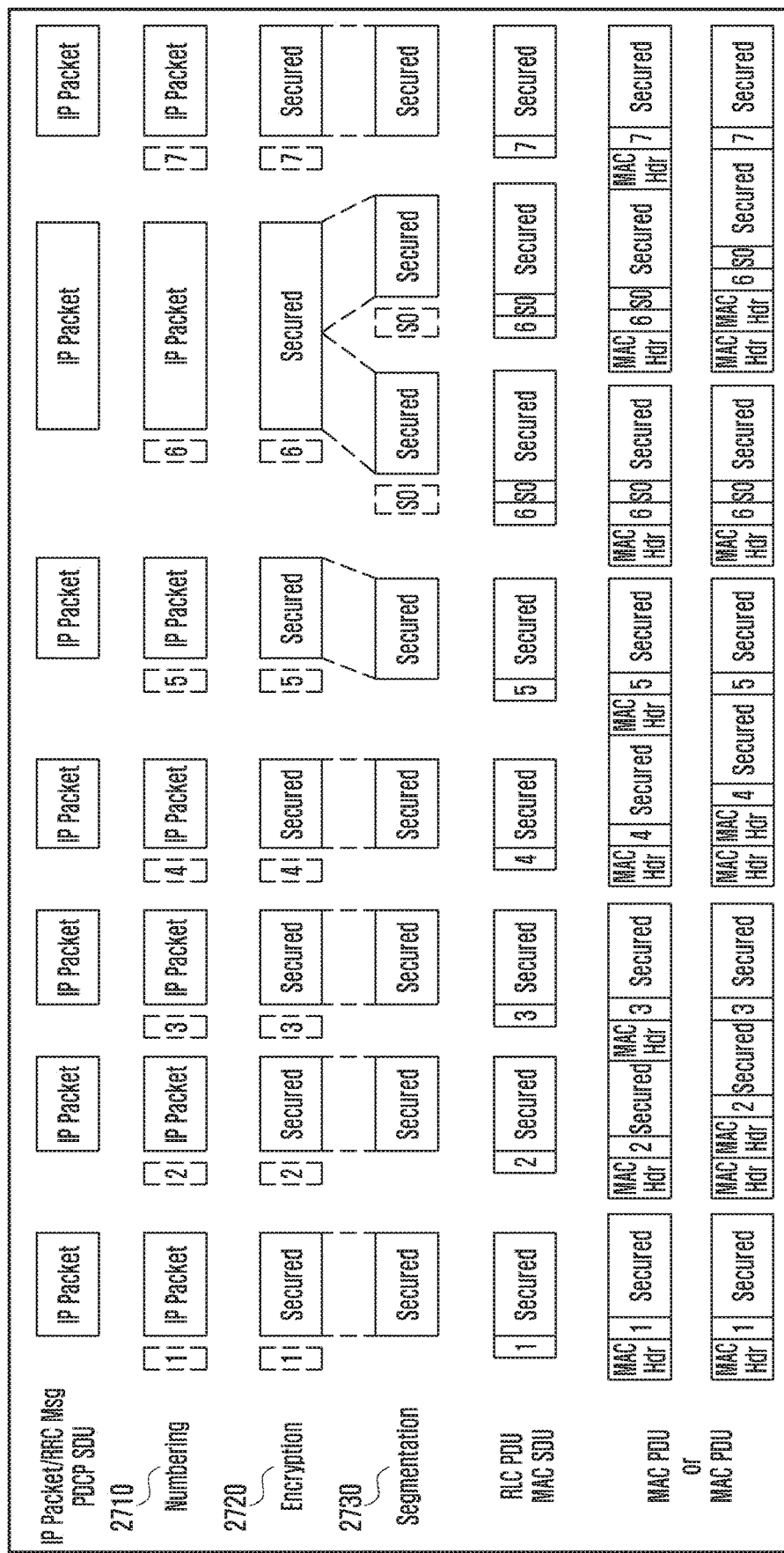
FIG. 27 is a diagram illustrating in detail a method for using a PDCP SN and an RLC SN into one by integrating the PDCP SN and the RLC SN according to an embodiment of the present disclosure.

FIG. 27 is a diagram illustrating in detail the method for using a PDCP SN and an RLC SN as one by integrating the PDCP SN and the RLC SN according to an embodiment of the present disclosure.

Referring to FIG. 27, the receiver may perform sequence numbering 2710 and encryption 2720 on the received packet.

In addition, if the packet segmentation is required according to the scheduling information, packet segmentation 2730 may be performed.

Further, the RLC layer may combine the RLC header with the packet to generate the RLC PDU (or MAC SDU). At this point, the RLC layer may allocate the RLC SN to the packet.

In addition, the MAC layer may add the MAC subheader to the MAC SDU to generate the MAC PDU.

At this point, the MAC subheaders may be located before each packet (or MAC SDU), or may be simultaneously located before the MAC PDU.

As described above, by using only one SN, the header overhead may be reduced.

Figure 28:
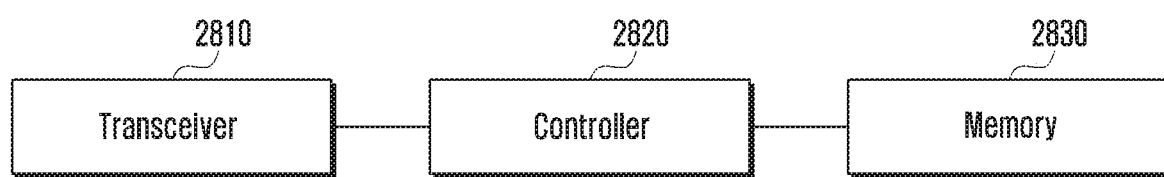
FIG. 28 is a diagram illustrating a configuration of user equipment (UE) according to an embodiment of the present disclosure.

FIG. 28 is a diagram illustrating a configuration of UE according to an embodiment of the present disclosure.

Referring to FIG. 28, the UE may include a transceiver 2810, a controller 2820, and a memory (or storage) 2830. For example, when defining a controller in the specification, it may be stated that "the controller may be a circuit, an application-specific integrated circuit or at least one processor."

The transceiver 2810 may transmit or receive a signal to or from the base station, and may include an interface unit for it. For example, the transceiver 2810 may receive configuration information, packets, and the like from the base station and may transmit the status report information. Further, the transceiver 2810 may receive the status report information from the base station.

The controller 2820 may control the operation of the UE and may control the UE to perform the operations described in the embodiment. Also, the controller 2820 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

As described above, the present disclosure describes, by way of example, the downlink transmission but may be identically operated even in the case of the uplink transmission, and therefore the controller 2820 may perform the operation described as the operation of the base station.

The memory 2830 may store at least one of information transmitted/received through the transceiver. Further, the storage 2830 may store at least one of the information generated by the controller 2820.

Further, as described above, the UE may be operated as the receiver in the downlink transmission and as the transmitter in the uplink transmission.

Figure 29:
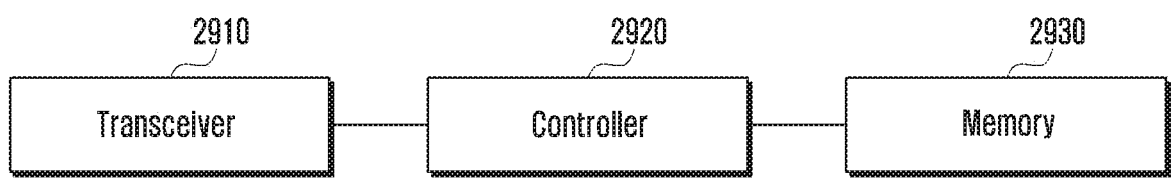
FIG. 29 is a diagram illustrating a configuration of a base station according to an embodiment of the present disclosure.

FIG. 29 is a diagram illustrating a configuration of a base station according to an embodiment of the present disclosure.

Referring to FIG. 29, the base station may include a transceiver 2910, a controller 2920, and a memory (or storage) 2930. For example, when defining a controller in the specification, it may be stated that "the controller may be a circuit, an application-specific integrated circuit or at least one processor."

The transceiver 2910 may transmit or receive a signal to or from the UE, and may include an interface unit for it. For example, the transceiver 2910 may transmit the configuration information, the packets, and the like to the UE and may receive the status report information from the UE. Further, the transceiver 2910 may transmit the status report information to the base station.

The controller 2920 may control the operation of the base station and may control the base station to perform the operations described in the embodiment. Also, the controller 2920 may include at least one processor. Further, the processor may be controlled by a program including instructions that execute the methods described in the embodiments of the present specification. Further, the program may be stored in a storage medium, and the storage medium may include a volatile or non-volatile memory. The memory may be a medium capable of storing data, and the form thereof is not limited as long as it stores the instructions.

As described above, the present disclosure describes, by way of example, the downlink transmission but may be identically operated even in the case of the uplink transmission, and therefore the controller 2920 may perform the operation described as the operation of the UE.

The storage 2930 may store at least one of information transmitted/received through the transceiver. Further, the storage 2930 may store at least one of the information generated by the controller 2920.

According to an embodiment of the present disclosure, it is possible to efficiently transmit the status report information on the packet transmission result. In addition, according to an embodiment of the present disclosure, it is possible to reduce the real-time throughput of the UE. Further, according to an embodiment of the present disclosure, it is possible to increase the degree of freedom of implementation upon the segmentation of the CU and the AU of the base station.

Further, as described above, the base station may be operated as the transmitter in the downlink transmission and as the receiver in the uplink transmission.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a receiving apparatus in a wireless communication system, the method comprising:
    receiving, from a transmitting apparatus, packets;
    identifying whether there are consecutively non-received radio link control (RLC) service data units (SDUs) based on the received packets; and
    transmitting, to the transmitting apparatus, a status report including an extension bit 3 (E3) field indicating whether information indicating a number of consecutively non-received RLC SDUs is present,
    wherein a length of the E3 field is 1 bit.

2. The method of claim 1, wherein, in case that the E3 field indicates 1, the information indicating the number of consecutively non-received RLC SDUs is present.

3. The method of claim 2, wherein the status report includes an extension bit 2 (E2) field indicating whether a segment offset start field and a segment offset end field are present.

4. The method of claim 3,
wherein the segment offset start field and the segment offset end field are present in case that the E2 field indicates 1, and
wherein the segment offset start field indicates a first position of a portion of a first RLC SDU and the segment offset end field indicates a second position of a portion of a second RLC SDU.

5. A method performed by a transmitting apparatus in a wireless communication system, the method comprising:
transmitting, to a receiving apparatus, packets; and
receiving, from the receiving apparatus, a status report including an extension bit 3 (E3) field indicating whether information indicating a number of consecutively non-received radio link control (RLC) service data units (SDUs) is present,
wherein a length of the E3 field is 1 bit.

6. The method of claim 5, wherein, in case that the E3 field indicates 1, the information indicating the number of consecutively non-received RLC SDUs is present.

7. The method of claim 6, wherein the status report includes an extension bit 2 (E2) field indicating whether a segment offset start field and a segment offset end field are present.

8. The method of claim 7,
wherein the segment offset start field and the segment offset end field are present in case that the E2 field indicates 1, and
wherein the segment offset start field indicates a first position of a portion of a first RLC SDU and the segment offset end field indicates a second position of a portion of a second RLC SDU.

9. A receiving apparatus in a wireless communication system, the receiving apparatus comprising:
a transceiver; and
at least one processor coupled with the transceiver and configured to:
receive, from a transmitting apparatus, packets,
identify whether there are consecutively non-received radio link control (RLC) service data units (SDUs) based on the received packets, and
transmit, to the transmitting apparatus, a status report including an extension bit 3 (E3) field indicating whether information indicating a number of consecutively non-received RLC SDUs is present,
wherein a length of the E3 field is 1 bit.

10. The receiving apparatus of claim 9, wherein, in case that the E3 field indicates 1, the information indicating the number of consecutively non-received RLC SDUs is present.

11. The receiving apparatus of claim 10, wherein the status report includes an extension bit 2 (E2) field indicating whether a segment offset start field and a segment offset end field are present.

12. The receiving apparatus of claim 11,
wherein the segment offset start field and the segment offset end field are present in case that the E2 field indicates 1, and
wherein the segment offset start field indicates a first position of a portion of a first RLC SDU and the segment offset end field indicates a second position of a portion of a second RLC SDU.

13. A transmitting apparatus in a wireless communication system, the transmitting apparatus comprising:
a transceiver; and
at least one processor coupled with the transceiver and configured to:
transmit, to a receiving apparatus, packets, and
receive, from the receiving apparatus, a status report including an extension bit 3 (E3) field indicating whether information indicating a number of consecutively non-received radio link control (RLC) service data units (SDUs) is present,
wherein a length of the E3 field is 1 bit.

14. The transmitting apparatus of claim 13, wherein, in case that the E3 field indicates 1, the information indicating the number of consecutively non-received RLC SDUs is present.

15. The transmitting apparatus of claim 14,
wherein the status report includes an extension bit 2 (E2) field indicating whether a segment offset start field and a segment offset end field are present,
wherein the segment offset start field and the segment offset end field are present in case that the E2 field indicates 1, and
wherein the segment offset start field indicates a first position of a portion of a first RLC SDU and the segment offset end field indicates a second position of a portion of a second RLC SDU.

\* \* \* \* \*